US010845490B2

(12) United States Patent
Yan et al.

(10) Patent No.: US 10,845,490 B2
(45) Date of Patent: *Nov. 24, 2020

(54) POSITRON EMISSION TOMOGRAPHY IMAGING SYSTEM

(71) Applicant: SHANGHAI UNITED IMAGING HEALTHCARE CO., LTD., Shanghai (CN)

(72) Inventors: Hao Yan, Shanghai (CN); Wei Zhang, Shanghai (CN); Huawei Jiang, Shanghai (CN); Shigang Su, Shanghai (CN); Miao Li, Shanghai (CN); Hongjun Zhang, Shanghai (CN); Weiping Liu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/439,763

(22) Filed: Jun. 13, 2019

(65) Prior Publication Data
US 2019/0331810 A1 Oct. 31, 2019

Related U.S. Application Data

(63) Continuation of application No. 15/692,118, filed on Aug. 31, 2017, now Pat. No. 10,345,460.

(30) Foreign Application Priority Data

Feb. 13, 2017 (CN) .......................... 2017 1 0075109
Feb. 13, 2017 (CN) .......................... 2017 1 0075120

(51) Int. Cl.
G01T 1/29 (2006.01)
G01T 1/16 (2006.01)

(52) U.S. Cl.
CPC .......... *G01T 1/2985* (2013.01); *G01T 1/1603* (2013.01)

(58) Field of Classification Search
CPC ........................... G01T 1/2985; G01T 1/1603
See application file for complete search history.

(56) References Cited

U.S. PATENT DOCUMENTS 6,327,506 B1    12/2001    Yogo et al.
6,444,987 B1 *   9/2002    Treillet ................. G01T 1/1642
                                                         250/363.01

(Continued)

FOREIGN PATENT DOCUMENTS

CN    101219056 A    7/2008
CN    201152892 Y    11/2008

(Continued)

OTHER PUBLICATIONS

First Office Action in Chinese Application No. 201710075109.5 dated Jun. 27, 2018, 10 pages.

(Continued)

*Primary Examiner* — Christine S. Kim
(74) *Attorney, Agent, or Firm* — Metis IP LLC

(57) ABSTRACT

The present disclosure relates to systems and methods for heat transfer and cooling in PET. The system may include a gantry including a gantry forming a detection tunnel; a detector mounted to the gantry, and positioned in a circumference of the detection tunnel; a heat transfer device thermally coupled with the detector and configured to transfer heat generated by the detector; and a cooling device thermally coupled to the heat transfer device, and configured to cool the heat transfer device.

19 Claims, 14 Drawing Sheets

(56) References Cited

U.S. PATENT DOCUMENTS

| | | |
|---|---|---|
| 7,129,501 B2 | 10/2006 | Iwanczyk et al. |
| 7,576,330 B1 | 8/2009 | Lacey et al. |
| 10,353,084 B1* | 7/2019 | Wagner ................ A61B 6/032 |
| 2004/0075059 A1 | 4/2004 | Serebryanov et al. |
| 2004/0217292 A1 | 11/2004 | Moyers et al. |
| 2005/0117698 A1 | 6/2005 | Lacey et al. |
| 2008/0011950 A1 | 1/2008 | Rose et al. |
| 2009/0120615 A1 | 5/2009 | Icoz et al. |
| 2009/0312822 A1 | 12/2009 | Besner |
| 2010/0040197 A1 | 2/2010 | Maniawski et al. |
| 2010/0188082 A1 | 7/2010 | Morich et al. |
| 2010/0242502 A1 | 9/2010 | Stautner |
| 2011/0240867 A1 | 10/2011 | Tonami |
| 2012/0046544 A1* | 2/2012 | Inoue .................... A61B 6/037 |
| | | 600/425 |
| 2012/0227929 A1 | 9/2012 | Rose et al. |
| 2013/0119259 A1 | 5/2013 | Martin |
| 2017/0059720 A1* | 3/2017 | McBroom ............. G01T 1/2985 |
| 2017/0311919 A1 | 11/2017 | Gagnon |

FOREIGN PATENT DOCUMENTS

| | | |
|---|---|---|
| CN | 102988077 A | 3/2013 |
| CN | 104799880 A | 7/2015 |
| JP | 201099396 A | 5/2010 |

OTHER PUBLICATIONS

First Office Action in Chinese Application No. 201710075120.1 dated Jul. 24, 2019, 16 pages.

* cited by examiner

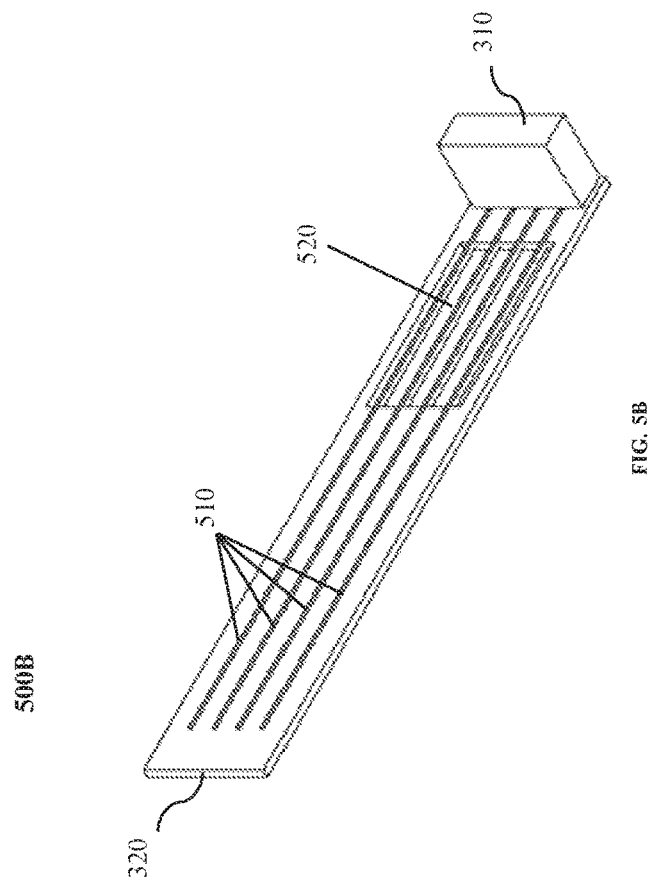
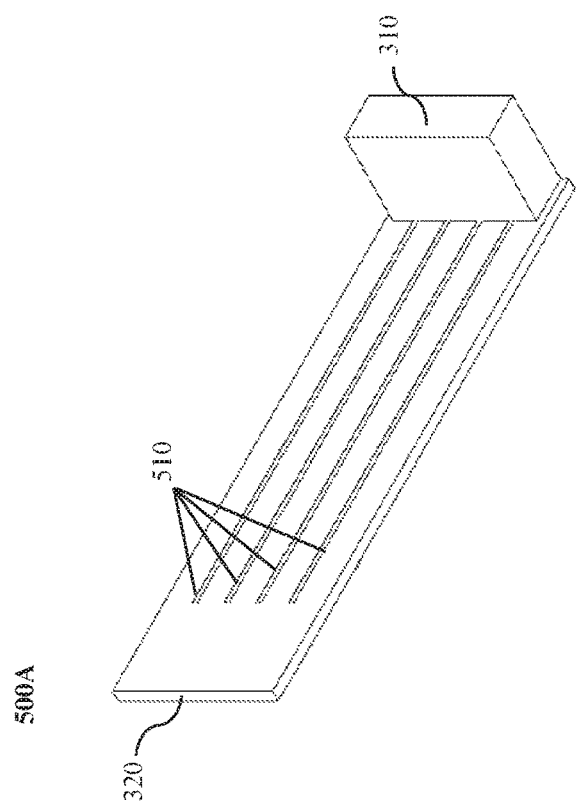

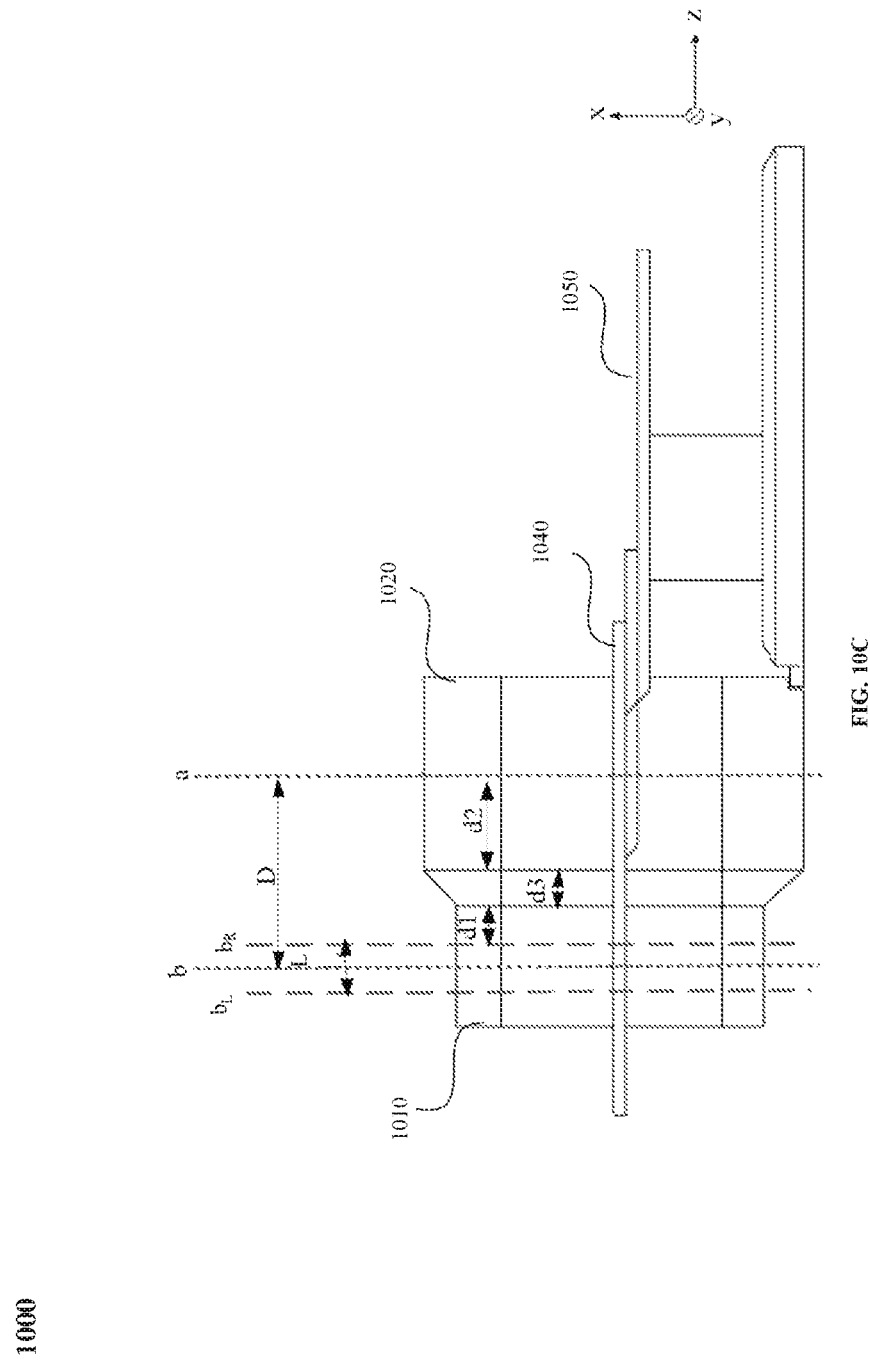

POSITRON EMISSION TOMOGRAPHY IMAGING SYSTEM

CROSS-REFERENCE TO RELATED APPLICATIONS

This application is a continuation of U.S. patent application Ser. No. 15/692,118, filed on Aug. 31, 2017, which claims priority to Chinese Patent Applications No. 201710075109.5 filed on Feb. 13, 2017 and No. 201710075120.1 filed on Feb. 13, 2017, the contents of each of which are hereby incorporated by reference.

TECHNICAL FIELD

The present disclosure generally relates to positron emission tomography (PET), and more particularly, to heat transfer and cooling systems and methods in PET.

BACKGROUND

PET has been widely used in clinical examination and disease diagnosis in recent years. A detector is an important component of a PET device. When the PET device performs a scan, the detector and/or other components of the PET device may generate heat, which may cause an increase in temperature, and affect the performance of the PET device or a portion thereof. The increase of temperature may have an impact on the operation of the detector. Thus, it is desirable to develop heat transfer and cooling systems and methods for the PET device that may solve the above mentioned problem.

SUMMARY

According to an aspect of the present disclosure, a positron emission tomography (PET) imaging system is provided. The system may include a gantry forming a detection tunnel; a detector mounted to the gantry, and positioned in a circumference of the detection tunnel; a heat transfer device thermally coupled with the detector and configured to transfer heat generated by the detector; and a cooling device thermally coupled to the heat transfer device, and configured to cool the heat transfer device.

In some embodiments, the heat transfer device may include a phase-change material.

In some embodiments, the system may further include an L-shaped connector configured to mount the detector to the gantry.

In some embodiments, the connector may include a fixing unit configured to fix the detector on the gantry; and a supporting unit configured to support the detector, the supporting unit having a first surface and a second surface.

In some embodiments, the gantry of the PET device may include a first end surface facing the first imaging device, a second end surface opposite to the first end surface along an axial direction of the detection tunnel, and at least one third surface. The connector may fix the detector on at least one third surface and/or the second surface of the gantry of the PET device except the first end surface.

In some embodiments, the detector may include a scintillator, a photodetector coupled to the scintillator, and a front-end circuit board coupled to the photodetector. The scintillator and the photodetector may be fixed on the first surface of the supporting unit of the connector. The second surface of the supporting unit may include a concave configured to accommodate the front-end circuit board.

In some embodiments, the system may include a first protective plate configured to cover the concave of the second surface of the supporting unit and the front-end circuit board.

In some embodiments, the first protective plate may include a slider, and the gantry may include a sliding rail that matches the slider.

In some embodiments, the system may include a second protective plate configured to cover the scintillator of the detector.

In some embodiments, the heat transfer device may include a first component and a second component. The second surface of the supporting unit may include a concave. The concave of the second surface of the supporting unit may include a first groove configured to accommodate the first component of the heat transfer device.

In some embodiments, the fixing unit of the connector may be made of a heat conductive material, and the fixing unit of the connector forms at least part of the second component of the heat transfer device.

In some embodiments, the fixing unit of the connector may include a second groove configured to accommodate the second component of the heat transfer device.

In some embodiments, the supporting unit may include a recess.

In some embodiments, the system may include a cooling device configured to cool the heat transfer device.

In some embodiments, the cooling device may include a cooling plate attached to the fixing unit of the connector, and the cooling plate may be configured to cool the fixing unit of the connector.

In some embodiments, the cooling plate may include a first cooling conduit for housing a first cooling liquid, a first cooling liquid inlet, and a first cooling liquid outlet.

In some embodiments, the cooling device may be integrated into the gantry; and the gantry may include a second cooling conduit for housing a second cooling liquid, a second cooling liquid inlet, and a second cooling liquid outlet.

According to an aspect of the present disclosure, an imaging system is provided. The imaging system may include a first imaging device and a second imaging device. The first imaging device is at least one of a magnetic resonance imaging (MRI) device, a computed tomography (CT) device, or an X-ray device. The second imaging device may be a positron emission tomography (PET) device including a gantry forming a detection tunnel; a detector mounted to the gantry via a connector, and positioned in a circumference of the detection tunnel. The gantry of the PET device may include a first end surface facing the first imaging device, a second end surface opposite to the first end surface along an axial direction of the detection tunnel, and at least one third surface. The connector may fix the detector on the at least one third surface and/or the second surface of the gantry of the PET device except the first end surface.

In some embodiments, the connector is L-shaped.

In some embodiments, the first imaging device may be the CT device.

In some embodiments, a distance between a central scanning cross section of the PET device and a central scanning cross section of the CT device is equal to or less than 330 mm.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5A illustrates a schematic diagram of an exemplary connector according to some embodiments of the present disclosure;

FIG. 5B illustrates a schematic diagram of an exemplary connector according to some embodiments of the present disclosure;

FIGS. 10A to 10C illustrate an exemplary imaging system according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Figure 2:
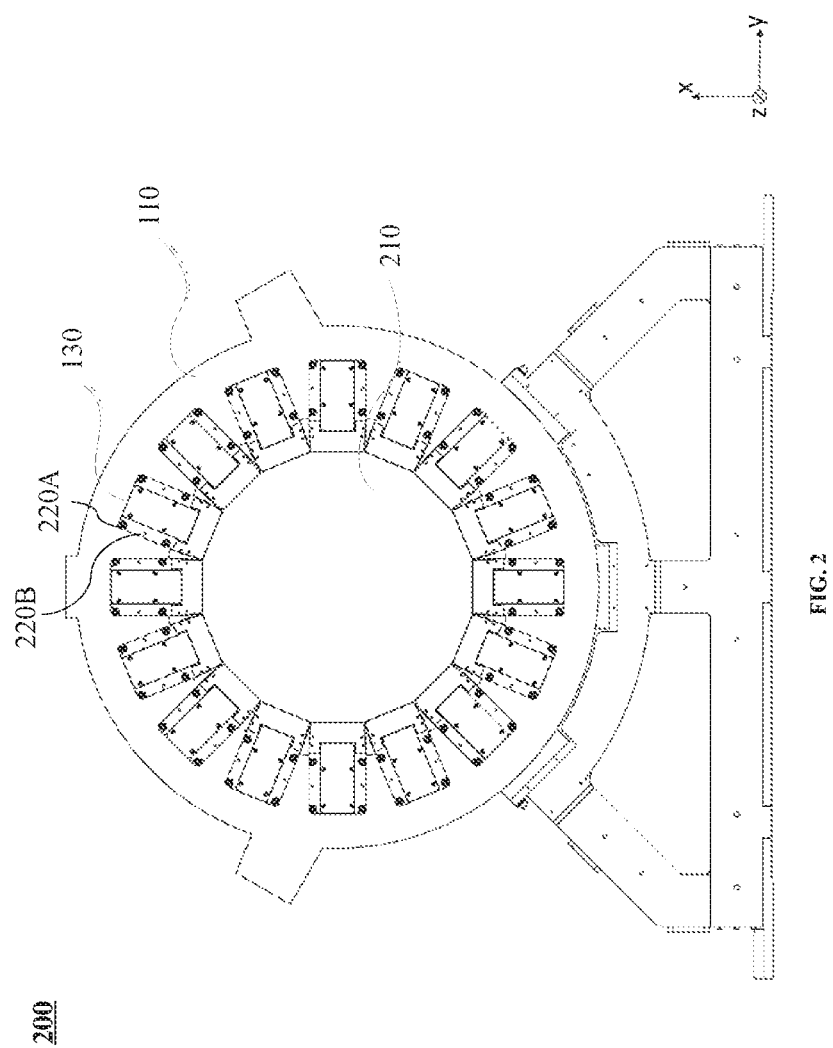
FIG. 2 illustrates a front view of an exemplary PET device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a PET imaging system. The PET imaging system may include a gantry including a detection tunnel, a detector, a connector, a heat transfer device, and a cooling device. The connector may be configured to establish a mechanical connection between the gantry and the detector. The connector may include a fixing unit configured to fix the detector on the gantry, and a supporting unit configured to support the detector. The heat transfer device may be configured to transfer away heat generated by the detector. For example, the heat transfer device may include a plurality of heat transfer pipes arranged on the fixing unit and/or the support unit. The cooling device may be configured to cool the heat transfer device. As such, the detector may operate at a desirable and stable temperature.

Figure 1:
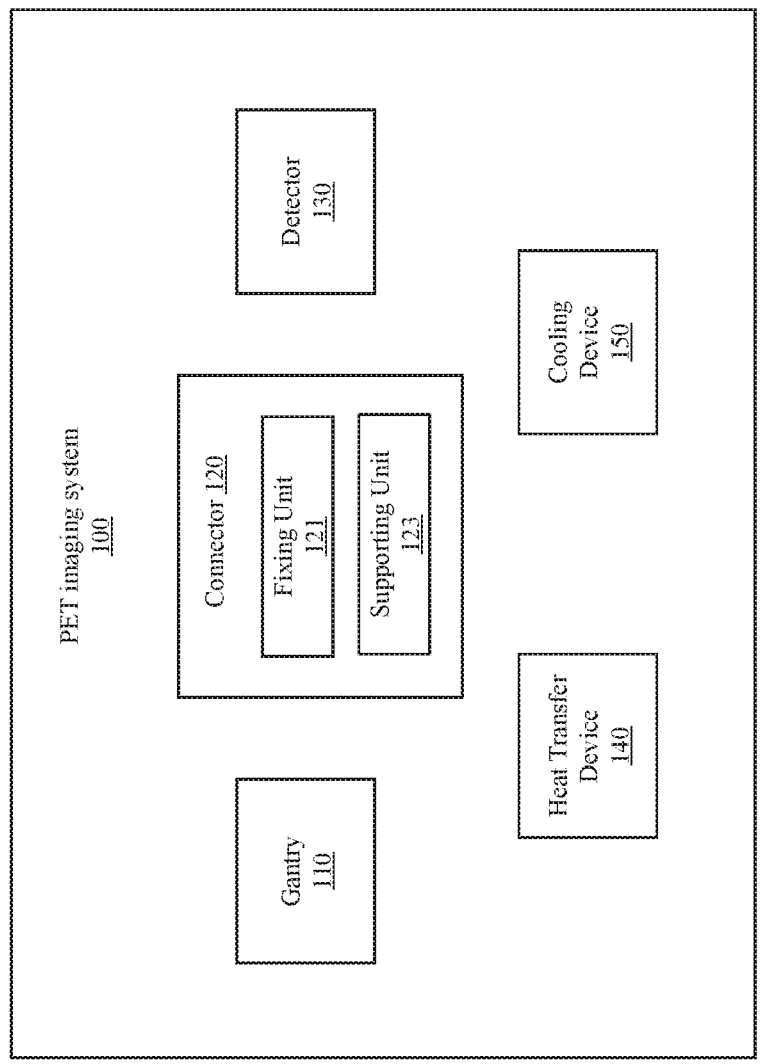
FIG. 1 is a block diagram illustrating an exemplary PET imaging system according to some embodiments of the present disclosure.

FIG. 1 is a block diagram illustrating an exemplary PET imaging system 100 according to some embodiments of the present disclosure. The PET imaging system 100 may include a gantry 110, a connector 120, a detector 130, a heat transfer device 140, and a cooling device 150.

The gantry 110 may be configured to support one or more components of the PET imaging system 100. For example, the gantry 110 may be configured to support the detector 130 and the connector 120. The gantry 110 may form a detection tunnel (not shown in FIG. 1). The detection tunnel may be configured to accommodate a subject for scan. For example, a patient may be placed on a table that may be inserted into the detection tunnel for scan.

The detector 130 may be configured to detect gamma rays. The detector 130 may be mounted on a circumference of the detection tunnel formed by the gantry 110. In some embodiments, the PET imaging system 100 may include a plurality of detectors. The detectors may be located along the circumference of the detection tunnel. The detectors may be arranged in any suitable configuration, for example, a ring, an arc, a rectangle, an array, or the like, or any combination thereof. In some embodiments, the detectors may be arranged in the form of one or more detector rings.

A subject (e.g., a patient) injected with a radiopharmaceutical may lie on the table for scan. The radiopharmaceutical may include radioisotopes that may decay and emit gamma rays of a characteristic energy level. In the process of decay, the radiopharmaceutical may emit positrons. The positrons may travel through the subject until they encounter electrons. When a positron and an electron meet, they may annihilate each other. The electron-positron annihilation may generate two gamma ray photons traveling in opposite directions.

In some embodiments, the detector 130 may include a scintillator, a photodetector, and a front-end circuit board. The photodetector may be coupled to the scintillator. The front-end circuit board may be coupled to the photodetector. The gamma ray photons generated by the electron-positron annihilation may strike the scintillator to produce bursts of visible or invisible light. The visible or invisible light may be converted to an electric signal (e.g., an electric pulse) by the photodetector. In some embodiments, the photodetector may be a photomultiplier tube (PMT).

The front-end circuit board may process the electric signal converted by the photodetector. Additionally or alternatively, the front-end circuit board may send the processed electrical signal to other components in the PET imaging system 100, such as a circuit board in the gantry 110. In some embodiments, the detector 130 may include one or more other components, e.g., a light guide configured to provide a light path to the photodetector.

The connector 120 may be configured to establish a mechanical connection between the gantry 110 and the detector 130. The connector 120 may include a fixing unit 121 and a supporting unit 123. The fixing unit 121 may be configured to fix the detector 130 on the gantry 110. The supporting unit 123 may be configured to support the detector 130. The fixing unit 121 and the supporting unit 123 may be separate parts that are mechanically connected to each other. Alternatively, the fixing unit 121 and the supporting unit 123 may form an integral connector. In some embodiments, the fixing unit 121 may be a fixing plate, and the supporting unit 123 may be a supporting plate. In some embodiments, the fixing unit 121 may be configured on one or more surfaces of the gantry 110 to fix the detector 130. In some embodiments, the fixing unit 121 and the supporting unit 123 may form an "L" shaped or approximate "L" shaped connector. More descriptions regarding various examples of the connector may be found elsewhere in the present disclosure. See, e.g., FIGS. 3 to 4B and the relevant descriptions.

The heat transfer device 140 may be configured to transfer heat generated by one or more components of the PET imaging system 100 away to maintain the system 100 or a portion thereof at a suitable temperature for normal operation. For example, the heat transfer device 140 may be thermally coupled to the detector 130 and transfer heat generated by the detector 130 away. The "thermally coupled" may refer that a thermal communication may be conducted between the heat transfer device 140 and the detector 130. The heat transfer device 140 may include a first component and a second component thermally coupled to the first component. The first component and the second component of the heat transfer device 140 may be separate parts. The separate first component and the second component of the heat transfer device 140 may be mechanically connected to each other or not. Alternatively, at least part of the first component and the second component of the heat transfer device 140 may form as an integral part.

In some embodiments, the first component may include one or more first heat transfer pipes, and the second component may include one or more second heat transfer pipes. The first and/or the second heat transfer pipes may be made of a heat conductive material. Additionally or alternatively, the first and/or the second heat transfer pipes may house a phase-change material. More descriptions regarding various examples of the heat transfer pipes of may be found elsewhere in the present disclosure at, e.g., FIGS. 4A to 5B and the relevant descriptions.

In some embodiments, the first component of the heat transfer device 140 may be the fixing unit of the connector 120. The fixing unit may be made of a heat conductive material. The fixing unit may or may not include the first heat transfer pipes. The second component of the heat transfer device 140 may be the second heat transfer pipes. The second heat transfer pipes may be mechanically connected to the fixing unit. The fixing unit may be configured to transfer heat from the second heat transfer pipes away.

Alternatively, the first component of the heat transfer device 140 may include the fixing unit and one or more first heat transfer pipe.

The cooling device 150 may be configured to cool one or more components of the PET imaging system 100, such as the detector 130 and/or the connector 120. In some embodiments, the cooling device 150 may be thermally coupled to the heat transfer device 140, and configured to cool the heat transfer device 140.

The cooling device 150 may include a cooling conduit, a cooling liquid inlet, and a cooling liquid outlet. The cooling conduit may be configured to house a cooling medium (e.g., a cooling liquid). The cooling liquid may flow into the cooling conduit via the cooling liquid inlet and flow out via the cooling liquid outlet. When the cooling liquid circulates though the cooling conduits, it may absorb heat from the one or more components of the PET imaging system 100.

In some embodiments, the cooling conduit may be accommodated inside or formed by the gantry 110. Additionally or alternatively, the PET imaging system 100 may include a cooling plate. In some embodiments, the cooling conduit of the cooling device 150 may be accommodated inside the cooling plate. In some embodiments, the cooling plate may form part of the cooling device 150. In some embodiments, the cooling device 150 may include a chiller. The chiller may be configured to cool the cooling liquid to a desired temperature (e.g., the temperature of the cooling liquid being less than a threshold). For example, the chiller may cool cooling liquid flowing from the cooling liquid outlet to a desired temperature. The processed cooling liquid may flow to the cooling liquid inlet and then flow through the cooling conduit.

It should be noted that the above descriptions of the PET imaging system 100 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the PET imaging system may include one or more PET rings. Each of the PET rings may include one or more same or similar components as illustrated in FIG. 1. In some embodiments, the PET imaging system may include a PET device and another imaging device (e.g., a Magnetic Resonance Imaging (MRI) device, a Computed Tomography (CT) device, an X-ray device). The PET device may include one or more same or similar components as illustrated in FIG. 1. However, those variations and modifications also fall within the scope of the present disclosure.

FIG. 2 illustrates a front view of an exemplary PET device 200 according to some embodiments of the present disclosure. The PET device 200 may include a gantry 110, one or more detectors (e.g., a detector 130), a detection tunnel 210, one or more screws (e.g., a screw 220A, a screw 220B). The gantry 110 may be configured to support one or more components of the PET device 200, such as the detectors. The detection tunnel 210 may be formed by the gantry 110.

The detectors may be arranged along the circumference of the detection tunnel 210. In some embodiments, the gantry 110 may include one or more surfaces. The surfaces may include a front end surface at the front end of the gantry 110, a rear end surface at the rear end of the gantry 110, a right surface of the right side of the gantry 110, a left surface on the left side of the gantry 110, a top surface on the top side of the gantry 110, a bottom surface on the bottom side of the gantry 110, or the like, or any combination thereof. The front end and the rear end may be two ends of the PET device 200 along the z-axis of the PET device 200. The front end surface and the rear end surface may be opposite to each other and spaced apart along the z-axis of the PET device 200. The right surface and the left surface may be opposite to each other and spaced apart along the y-axis. The top surface and the bottom surface may be opposite to each other and spaced apart along the x-axis. As used herein, the z-axis may refer to a direction along which an object is moved into and out of the detection tunnel 210. The x axis and y axis may form an x-y plane that is perpendicular to the z axis.

The front end surface and the rear end surface at two ends of the gantry 110 may also be referred to as end surfaces of the PET device. The right surface, a left surface, a top surface, a bottom surface may also be referred to as side surfaces of the PET device. For a gantry having a closed cross-section (e.g., a cross-section having a shape of a circle, an ellipse, a polygon), a surface of the gantry 110 may refer to an inner wall of the side of the gantry 110, an outer wall of the side of the gantry 110, a front end surface at one end of the gantry 110, a rear end surface at another end of the gantry 110.

The detectors may be assembled on the gantry 110 via a fixing mechanism (e.g., one or more connectors, and/or screws as described elsewhere in this disclosure) on one or more surfaces of the gantry 110. For example, as illustrated in FIG. 2, at least a portion of the detectors may be assembled via a fixing mechanism on the front end surface of the gantry 110. Additionally or alternatively, at least a portion of the detectors may be assembled via a fixing mechanism on another surface of the gantry 110. For example, a plurality of detectors may be assembled via a fixing mechasism on the rear end surface of the gantry 110. In some embodiments, the detectors may be assembled on the gantry 110 via a fixing mechanism on only one of the end surfaces and/or one or more side surfaces of the gantry 110. When assembled on one or more surfaces of the gantry 110, the detectors may be assembled tight and in a desirable position on the gantry 110.

It should be noted that the above descriptions of the detectors are provided for the purpose of illustration, and not intended to limit the scope of the present disclosure. Various variations and modifications may be conducted under the teaching of the present disclosure. The detectors may be assembled on the gantry 110 via a fixing mechanism on any surface of the gantry 110.

The screws may be configured to mount the detectors onto the gantry 110. For example, the screw 220A and the screw 220B may be configured to mount the detector 130 on the gantry 110. The size of the screws may be the same as or different from each other. For example, the size of the screw 220A may be greater than the screw 220B as illustrated in FIG. 2. In some embodiments, the detectors may be mounted on the gantry 110 by, such as glue, positioning slots, nails, pins, or the like, or a combination thereof.

It should be noted that the example illustrated in FIG. 2 is provided for the purpose of illustration, and not intended to limit the scope of the present disclosure. Various variations and modifications may be conducted under the teaching of the present disclosure. For example, the PET device 200 may have any number of screws and/or detectors. The screws and/or the detectors may be arranged in any configuration and/or any position on the PET device 200. As another example, the PET device 200 may include a heat transfer device and a cooling device (not shown in FIG. 2). The heat transfer device may be configured to transfer away heat generated by one or more components of the PET device 200 (e.g., the detectors). The cooling device may be configured to cool the heat transfer device.

Figure 3:
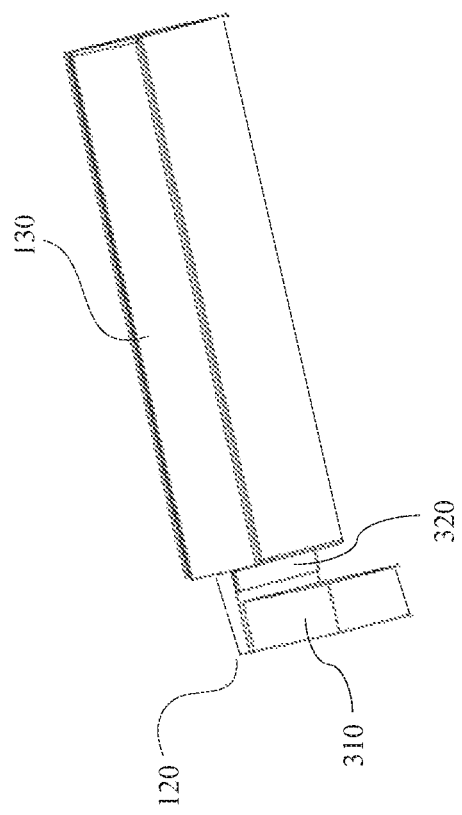
FIG. 3 illustrates a schematic diagram of an exemplary connector and an exemplary detector according to some embodiments of the present disclosure.

FIG. 3 illustrates a schematic diagram of an exemplary connector 120 and an exemplary detector 130 according to some embodiments of the present disclosure. The connector 120 may establish a mechanical connection between the detector 130 and a gantry 110 (not shown in FIG. 3). The connector 120 may include a fixing plate 310 and a supporting plate 320.

The fixing plate 310 may fix the detector 130 on a surface of the gantry 110. For example, the fixing plate 310 may be arranged on a front end surface and/or a rear end surface of the gantry 110 to fix the detector 130 to the gantry 110. The front end surface and the rear end surface may be two end surfaces opposite to each other and spaced apart along the z-axis of a PET device as described in connection with FIG. 2. The fixing plate 310 may be directly or indirectly mounted on the gantry 110. The supporting plate 320 may be placed inside a detection tunnel formed by the gantry 110 when the fixing plate 310 is mounted onto the gantry 110. At least part of the supporting plate 320 may be placed inside the detector 130 to support the detector 130.

The fixing plate 310 and the supporting plate 320 may be separate parts, and are mechanically connected to each other to form the connector 120. Alternatively, the fixing plate 310 and the supporting plate 320 may be an integral part. In some embodiments, the fixing plate and the supporting plate may be perpendicular to each other to form an "L" shaped or approximate "L" shaped connector.

In some embodiments, at least part of the connector 120 may be made of or include a heat conductive material. For example, the fixing plate 310 and/or the supporting plate 320 may be made of an aluminum magnesium alloy, a magnesium alloy, a copper alloy, or the like, or any combination thereof. As another example, the fixing plate 310 and/or the supporting plate 320 may include and/or house a phase-change material. The phase-change material may change its phase according to its temperature. The phase-change material may absorb or release heat when it changes its phase.

It should be noted that the structures and functions described above in relation to the example in FIG. 3 is provided for the purpose of illustration, and not intended to limit the scope of the present disclosure. Various variations and modifications may be conducted under the teaching of the present disclosure. For example, the fixing plate 310 and the supporting plate 320 may be configured in any regular shape or irregular shape to facilitate the fixation of a detector onto the gantry 110. As another example, the angle between the fixing plate 310 and the supporting plate 320 may be any angle between 0 degree and 180 degrees, such as 80 degrees.

Figure 4B:
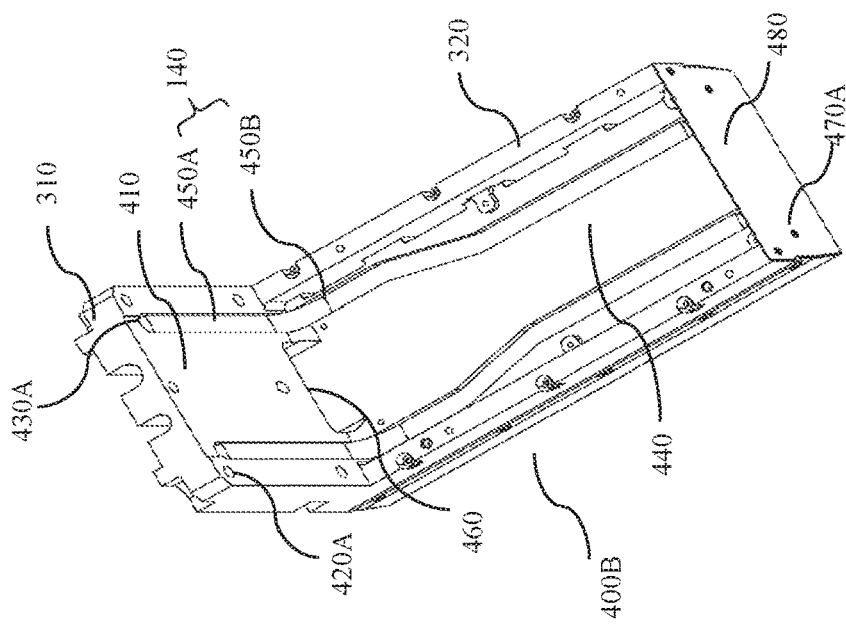
FIG. 4B illustrates an exemplary connector and an exemplary heat transfer device according to some embodiments of the present disclosure.
Figure 4A:
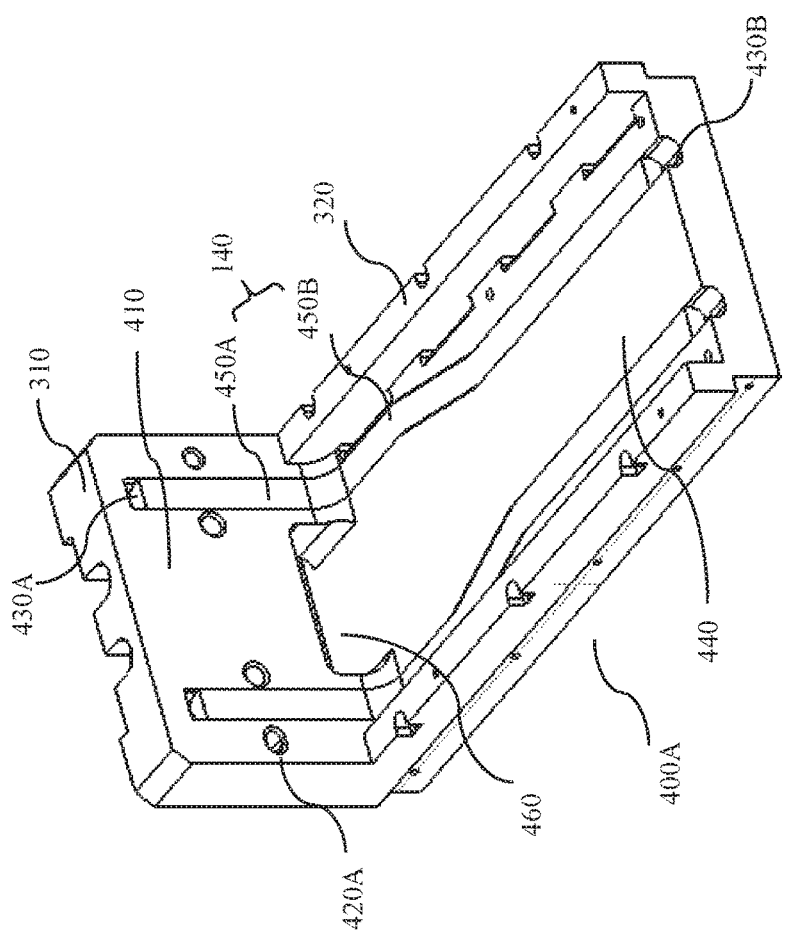
FIG. 4A illustrates an exemplary connector and an exemplary heat transfer device according to some embodiments of the present disclosure.

FIG. 4A illustrates an exemplary connector 400A and an exemplary heat transfer device 140 according to some embodiments of the present disclosure. The connector 400A may include a fixing plate 310 and a supporting plate 320. The heat transfer device 140 may include a first component and a second component. The first component and/or the second component of the heat transfer device 140 may be made of or include a heat conductive material.

In some embodiments, the first component may include one or more first heat transfer pipes (e.g., a first heat transfer pipe 450A). The second component may include one or more second heat transfer pipes (e.g., a second heat transfer pipe 450B). The first and/or the second heat transfer pipes may be made of a heat conductive material. Additionally or alternatively, the first and/or the second heat transfer pipes may be configured to house a phase-change material. The phase-change material may change its phase according to its temperature. In some embodiments, the phase-change material housed in the first and/or second heat transfer pipes may have a desirable or low boiling point. When the temperature increases and exceeds its boiling point, the phase-change material may absorb heat and change its phase (e.g., vaporization). When the temperature decreases and falls below its boiling point, the phase-change material may release heat and change its phase (e.g., condensation). Alternatively, the phase-change material housed in the first and/or second heat transfer pipes may have a desirable or low melting point. When the temperature increases and exceeds its melting point, the phase-change material may absorb heat and change its phase (e.g., melting). When the temperature decreases and falls below its melting point, the phase-change material may release heat and change its phase (e.g., freezing). Alternatively, the phase-change material housed in the first and/or second heat transfer pipes may change from the solid phase directly to the gas phase under an operation condition of the heat transfer device 140 cooling the detector 130; the phase-change material housed in the first and/or second heat transfer pipes may change from the gas phase directly to the solid phase under an operation condition of the heat transfer device 140 being cooled by a cooling device as described elsewhere in this disclosure.

The first component and the second component of the heat transfer device 140 may include any suitable number of heat transfer pipes, respectively. The number of the first heat transfer pipes and the number of the second heat transfer pipes may be the same as or different from each other. For example, as illustrated in FIG. 4A, the first component and the second component may include two heat transfer pipes, respectively.

The first component and the second component of the heat transfer device 140 may be separate parts. The separate first component and the second component of the heat transfer device 140 may be mechanically connected to each other or not. Alternatively, at least part of the first component and the second component of the heat transfer device 140 may form as an integral part. For example, the heat transfer pipe 450A and the heat transfer pipe 450B may form as an integral "L" shaped heat transfer pipe. The first component and the second component of the heat transfer device 140 may be in fluid communication with each other.

In some embodiments, the first component of the heat transfer device 140 may include the fixing plate 310 that is made of or include a heat conductive material. The second component (e.g., the second heat transfer pipe 450B) of the heat transfer device 140 may include the second heat transfer pipes. The second heat transfer pipes may extend to the fixing plate 310, or otherwise be in mechanical contact and/or thermally coupled with the fixing plate 310. The fixing plate 310 may be configured to transfer heat away from the second heat transfer pipes to cool down the second heat transfer pipes.

Alternatively, the first component of the heat transfer device 140 may include the fixing plate 310 and the first heat transfer pipes (e.g., the first heat transfer pipe 450A). The fixing plate 310 may provide support for the first heat transfer pipes. The fixing plate 310 and the first heat transfer pipes may be in mechanical contact and/or thermally coupled with each other.

The fixing plate 310 may include an installation surface 410. The installation surface 410 of the fixing plate 310 may be attached to a surface of a gantry 110 (e.g., the front end surface) so that a detector attached to the fixing plate 310 is fixed on the gantry. One or more of first grooves (e.g., a first groove 430A) and one or more of holes (e.g., a hole 420A)

may be configured on the installation surface 410. The first grooves may be configured to accommodate the first component of the heat transfer device 140. For example, the first groove 430A may be configured to accommodate the first heat transfer pipe 450A.

The holes may be configured to facilitate the fixation of the fixing plate 310 on the gantry 110. For example, the hole 420A may be a pin hole. The front end surface of the gantry 110 may include a pin that matches the hole 420A. The pin on the front end surface of the gantry 110 may be inserted into the hole 420A when the installation surface 410 is attached to the front end surface of the gantry 110. As another example, the front end surface of the gantry 110 may include a hole aligned to the hole 420A. A nail or a screw may be inserted to the hole 420A and the hole on the front end surface of the gantry 110 such that the installation surface 410 abuts against the front end surface of the gantry 110.

Any suitable number of holes and any suitable number of first grooves may be configured on the fixing plate 310. For example, four holes and two first grooves may be configured on the fixing plate 310 as illustrated in FIG. 4A. As another example, the fixing plate 310 may have no first grooves. The fixing plate 310 may be made of a heat conductive material to form the first component of the heat transfer device 140. The holes and the first grooves may be arranged according to a configuration on the fixing plate 310 for stable attachment of the fixing plate 310 and the detector on the gantry 110. For example, the first groove 430A may be extended through a portion of the thickness of the fixing plate 310 between the bottom side and the top side of the fixing plate 310 as illustrated in FIG. 4A.

In some embodiments, one or more holes and/or one or more first grooves may be configured on the fixing plate 310 on the surface opposite to the installation surface 410. The holes and the first grooves on the surface opposite to the installation surface 410 may be similar to those on the installation surface 410, and the detailed description is not repeated. In some embodiments, the fixing plate 310 may include one or more pins. The gantry 110 may include one or more holes that match the pins. The pins of the fixing plate 310 may be inserted into the matched holes such that the fixing plate 310 is attached to the gantry 110.

A concave 440 may be configured on the supporting plate 320 to accommodate a front-end circuit board of a detector 130. The concave 440 may include one or more of second grooves (e.g., a second groove 430B). The second grooves may be configured to accommodate the second component of the heat transfer device 140. For example, the second groove 430B may be configured to accommodate the second heat transfer pipe 450B. In some embodiments, the second grooves on the supporting plate 320 may be similar to the first grooves on the fixing plate 310. For example, the second groove 430B may extend all the way through to the bottomside of the first groove 430A such that the second groove 430B is in fluid communication with the first groove 430A as illustrated in FIG. 4A. In some embodiments, the supporting plate 320 may include one or more third grooves (not shown in FIG. 4A) on one or more other surfaces (e.g., a surface opposite to the concave 440). The third grooves may be configured to accommodate at least part of the second component of the heat transfer device 140 (e.g., one or more second heat transfer pipes).

The fixing plate 310 and the supporting plate 320 may form an opening 460 at the joint of the fixing plate 310 and the supporting plate 320. The opening 460 may be configured to accommodate a cable, such as an electrical cable and/or a data cable.

It should be noted that the structures and functions described above in relation to the examples illustrated in FIG. 4A are provided for the purposes of illustration, and not intended to limit the scope of the present disclosure. Various variations and modifications may be conducted under the teaching of the present disclosure. In some embodiments, the heat transfer device 140 may be configured in a form other than the heat transfer pipes. For example, the heat transfer device 140 may include a heat transfer plate that is made of or includes a heat conductive material. In some embodiments, the heat transfer device 140 and the connector 400A may form as an integral part. For example, the second heat transfer pipes may be integrated into the supporting plate 320. Additionally or alternatively, the first heat transfer pipes may be integrated into the fixing plate 310.

FIG. 4B illustrates an exemplary connector 400B and an exemplary heat transfer device 140 according to some embodiments of the present disclosure. The connector 400B is similar to the connector 400A as described in connection with FIG. 4A, except for certain components or features. For example, one or more protective plates may be configured to cover the connector 400B and/or a detector (not shown in figures). The protective plates may protect the connector 400B, the heat transfer device 140 and/or the detector from, such as light and dust. The protective plates may be fixed on the connector 400B via, for example, one or more screws, nails, pins, glue, positioning slots, or the like, or a combination thereof. For example, as illustrated in FIG. 4B, t a protective plate 480 may be configured to cover the front side of the supporting plate 320. The protective plate 480 may be fixed on the supporting plate 320 via, for example, a plurality of first screws (e.g., a screw 470).

It should be noted that the structures and functions described above in relation to the examples illustrated in FIG. 4B are provided for the purposes of illustration, and not intended to limit the scope of the present disclosure. Various variations and modifications may be conducted under the teaching of the present disclosure.

In some embodiments, the connector 400B may be covered by any number of protective plates. The protective plates may cover any side of the connector 400B. For example, a third protective plate may be configured to cover the concave 440 of the supporting plate 320. A fourth protective plate may be configured to cover the bottom side of the supporting plate 320. A fifth protective plate may be configured to cover the installation surface 410 of the fixing plate 310. In some embodiments, a plurality of protective plates may be configured to cover the connector 400B and/or the detector. The protective plates may be separate parts. At least two separate protective plates may be mechanically connected to each other or not. Additionally or alternatively, two or more of the protective plates may form as an integral protective plate.

FIG. 5A illustrates a schematic diagram of an exemplary connector 500A according to some embodiments of the present disclosure. The connector 500A may include a fixing plate 310 and a supporting plate 320. The supporting plate 320 may include one or more grooves 510. The grooves 510 may be configured to accommodate at least part of the heat transfer device 140. For example, the heat transfer device 140 may include one or more heat transfer pipes. The grooves 510 may be configured to accommodate at least part of the heat transfer pipes. The grooves 510 may be similar to the second grooves of the connector 400A, and the detailed description is not repeated here.

FIG. 5B illustrates a schematic diagram of an exemplary connector 500B according to some embodiments of the present disclosure. The connector 500B is similar to the connector 500A, except that the supporting plate 320 of the connector 500B may include a recess 520. The recess 520 may reduce the weight of the connector 500B. The recess 520 may be arranged in any position other than the positions of the grooves 510 on the supporting plate 320. In some embodiments, there may be more than one portion of recess 520 that are spaced apart from each other by a distance. The recess 520 may have a regular shape or an irregular shape. In some embodiments, the depth of the recess 520 may be smaller than the thickness of the supporting plate 320. Alternatively, the supporting plate 320 may include a through hole. The through hole of the suppporting plate 310 may reduce the weight of the connector 500B.

Figure 6B:
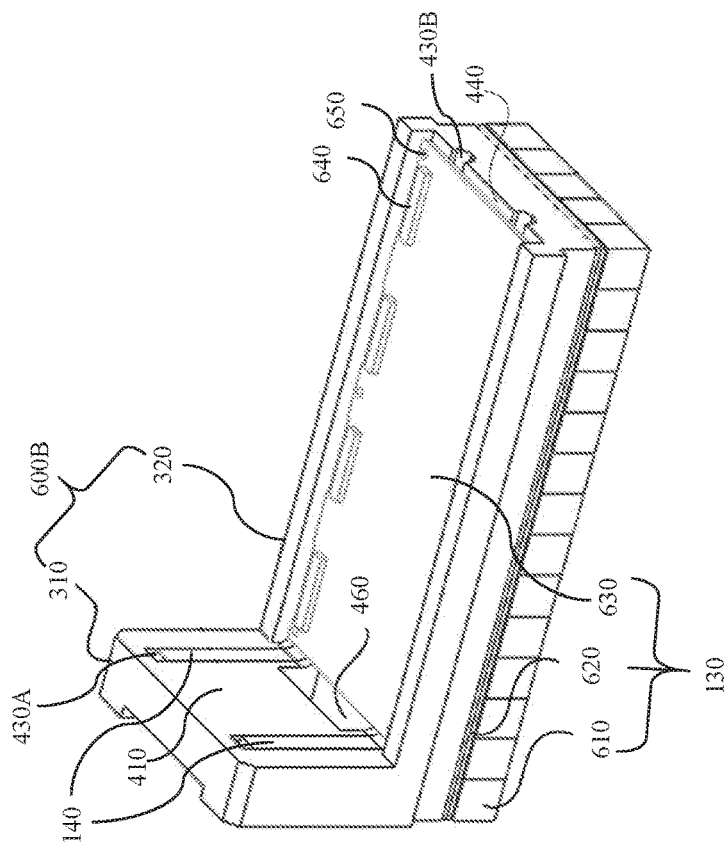
FIG. 6B illustrates an exemplary connector, an exemplary detector, and an exemplary heat transfer device according to some embodiments of the present disclosure.
Figure 6A:
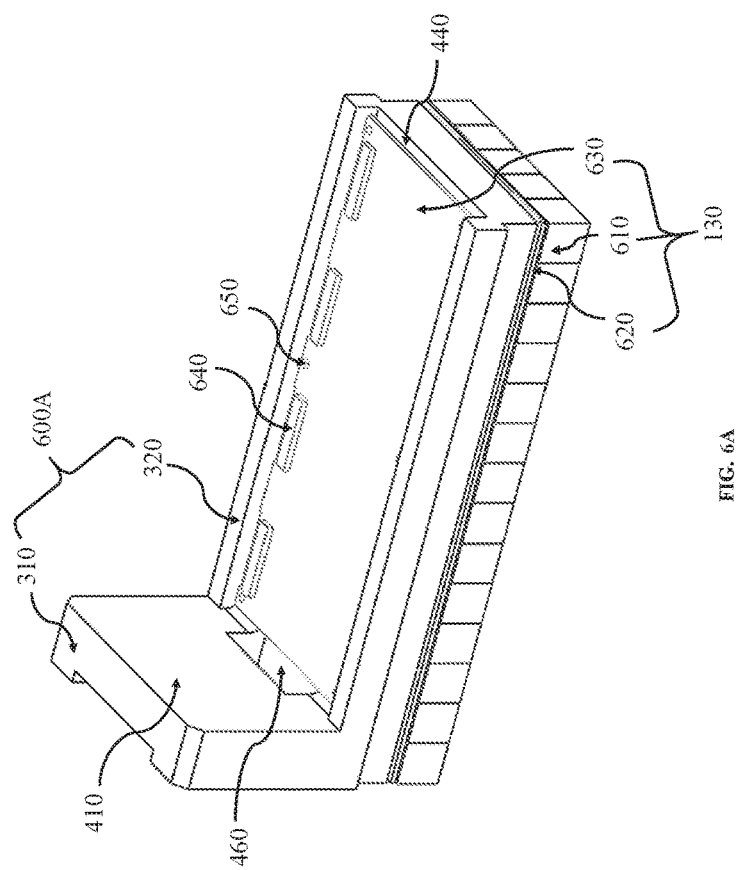
FIG. 6A illustrates an exemplary connector and an exemplary detector according to some embodiments of the present disclosure.

FIG. 6A illustrates an exemplary connector 600A and an exemplary detector 130 according to some embodiments of the present disclosure. The connector 600A may be similar to the connector 400A as described in connection with FIG. 4A, except for certain components or features. For example, the fixing plate 310 of the connector 600A does not include the holes and/or the first grooves (e.g., the first groove 430A). As another example, the supporting plate 320 of the connector 600A does not include the second grooves (e.g., the first groove 430B).

The detector 130 may include a scintillator 610, a photodetector 620, and a front-end circuit board 630. The one or more components of the detector may or may not be connected with each other. For example, the photodetector 620 may be coupled to the scintillator 610. The front-end circuit board 630 may be coupled to the photodetector 620. As described in connection with FIG. 1, gamma ray photons generated by electron-positron annihilation events may strike the scintillator 610 to produce bursts of visible or invisible light. The visible or invisible light may be converted to an electric signal (e.g., an electric pulse) by the photodetector 620. The front-end circuit board 630 may process the electric signal converted by the photodetector 620.

In some embodiments, the scintillator 610 may include one or more arrays of scintillation crystals. The photodetector 620 may include one or more photoelectric detection boards. The front-end circuit board 630 may include one or more interfaces 640. For instance, an interface 640 may include a cable. The front-end circuit board 630 may transmit the electrical signal and/or processed electrical signal to other components in a PET device via the interface 640. For example, the front-end circuit board 630 may transmit the electrical signal, processed or not, to a circuit board in the gantry 110 via the interface 640.

The connector 600A may establish a mechanical connection between the detector 130 and the gantry 110 as described in connection with FIGS. 1 and 4A. The front-end circuit board 630 may be fixed in the concave 440 of the supporting plate 320. The scintillator 610 and the photodetector 620 may be fixed on the surface opposite to the bottom surface of the concave 440 of the supporting plate 320. In some embodiments, the scintillator 610, the photodetector 620, and the front-end circuit board 630 may be fixed on the supporting plate 320 using one or more nails, screws, pins, glue, positioning slots, or the like, or a combination thereof. For example, the front-end circuit board 630 may be fixed in the concave 440 via a plurality of screws 650.

FIG. 6B illustrates an exemplary connector 600B, an exemplary detector 130, and an exemplary heat transfer device 140 according to some embodiments of the present disclosure. The heat transfer device 140 may be similar to that as described in connection with FIGS. 4A and 4B, and the description thereof is not repeated.

The connector 600B may be similar to the connector 600A as described in connection with FIG. 6A, except for certain components or features. The fixing plate 310 of the connector 600B may include one or more first grooves (e.g., the first groove 430A) to accommodate a first component of the heat transfer device 140 (e.g., one or more first heat transfer pipes). The concave 440 of the supporting plate 320 may include one or more second grooves (e.g., the second groove 430B) to accommodate a second component of the heat transfer device 140 (e.g., one or more second heat transfer pipes). The heat transfer device 140 may transfer the heat generated by one or more components of the detector 130 (e.g., the scintillator 610, the photodetector 620, and the front-end circuit board 630) away.

It should be noted that the structures and functions described above in relation to the examples illustrated in FIGS. 6A and 6B are provided for the purposes of illustration, and not intended to limit the scope of the present disclosure. Various variations and modifications may be conducted under the teaching of the present disclosure. For example, the fixing plate 310 may be made of a heat conductive material to form the first component of the heat transfer device 140. As another example, the supporting plate 320 may include one or more second grooves on another surface other than the concave 440, such as on the surface opposite to the concave.

Figures 6C, 6D:
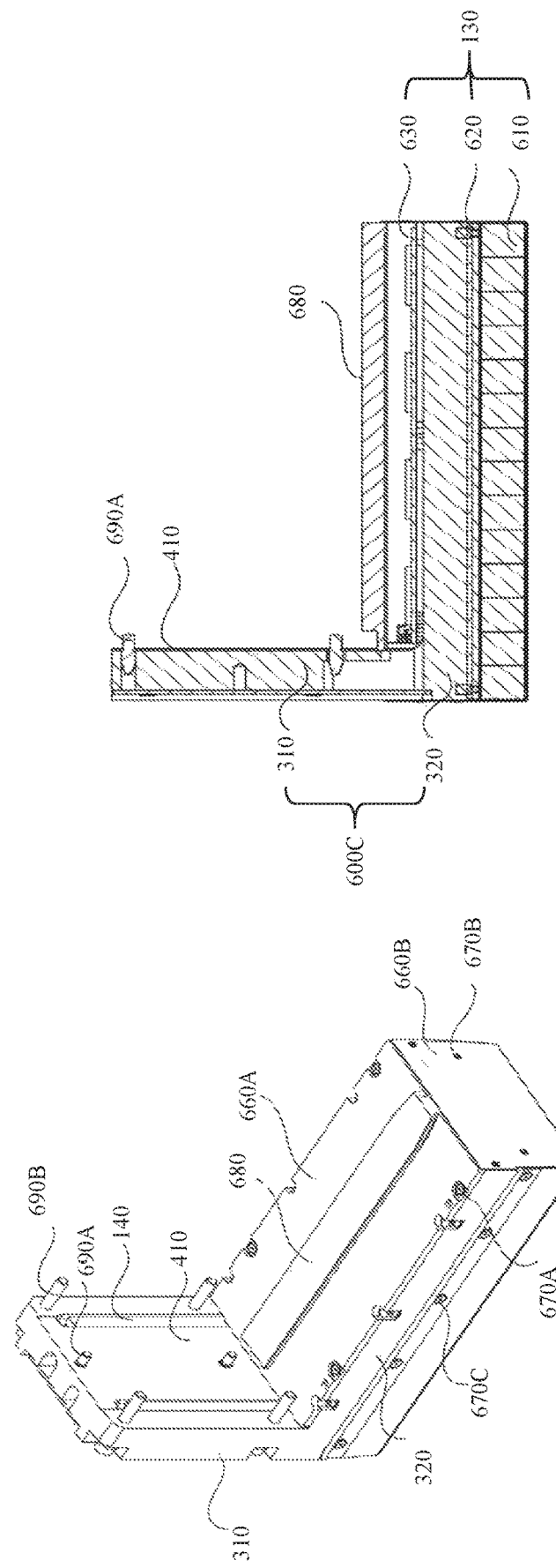
FIG. 6C illustrates a perspective view of an exemplary connector, an exemplary detector, and an exemplary heat transfer device according to some embodiments of the present disclosure.
FIG. 6D illustrates a cross-sectional view of an exemplary connector, an exemplary detector, and an exemplary heat transfer device according to some embodiments of the present disclosure.

FIGS. 6C and 6D illustrate a perspective view and a cross-sectional view of an exemplary connector 600C, an exemplary detector 130, and an exemplary heat transfer device 140 according to some embodiments of the present disclosure. The connector 600C may be similar to the connector 600B as described in connection with FIG. 6B, except for certain components or features.

One or more protective plates may be configured to cover the connector 600C and/or the detector 130. For example, the connector 600C and/or the detector 130 may be covered by a first protective plate 660A, a second protective plate 660B, and a third protective plate (not shown in FIG. 6). The first protective plate 660A may cover the concave 440 and the front-end circuit board 630. The second protective plate 660B may cover the front side of the supporting plate 320. The third protective plate may cover the bottom side of the detector 130 (e.g., the scintillator 610). The protective plates may be fixed on the supporting plate 320 via, e.g., one or more screws (e.g., a screw 670A, a screw 670B, and a screw 670B), glue, positioning slots, or the like, or a combination thereof.

In some embodiments, the protective plates may be made of, for example, a carbon fiber, a magnesium alloy, an aluminum alloy, a beryllium alloy, or any suitable material. For example, one or more of the protective plates may be made of a carbon fiber. Different protective plates may be made of the same or different materials. Different protective plates may have the same or different configurations (e.g., shapes, sizes, thicknesses).

In some embodiments, photons generated by electron-positron annihilation events (e.g., gamma photons) may pass through the third protective plate covering the bottom side of the detector 130 (e.g., the scintillator 610). The photons may be unable or substantially unable to pass through the other protective plates that are configured on the other sides of the connector 600C and/or detector 130. For example, the photons may be unable or substantially unable to pass through the other first protective plate 660A covering the concave 440 and the front-end circuit board 630, and the second protective plate 660B covering the front side of the supporting plate 320. In some embodiments, a third protective plate may be thinner than the other protective plates so that photons may pass through the third protective plate but not the other protective plates.

The first protective plate 660A may include a slider 680. The slider 680 may be protruded from the top surface of the first protective plate 660A. The gantry 110 may include a sliding rail that matches the slider 680. The slider 680 may slide into the sliding rail on the gantry 110 so that the connector 600C may be attached to the gantry 110.

The installation surface 410 may be attached to a surface of the gantry 110 when the connector 600C fixes a detector 130 to the gantry 110. In some embodiments, a pin (e.g., a pin 690A) may be installed on the installation surface 410. The gantry 110 may include a hole that matches the pin. When the installation surface 410 is attached to the gantry 110, the pin on the installation surface 410 may be inserted into the corresponding hole on the gantry 110. Additionally or alternatively, the installation surface 410 may include a hole. The gantry 110 may include a pin that matches the hole. The pin on the gantry 110 may be inserted into the corresponding hole on the installation surface 410. In some embodiments, the installation surface 410 and the gantry 110 may respectively include a hole aligned to each other. A screw (e.g., a screw 690B) may be inserted into the hole on the installation surface 410 and the hole on the front end surface of the gantry 110 when the installation surface 410 is attached to the front end surface of the gantry 110.

It should be noted that the structures and functions described above in relation to the examples illustrated in FIGS. 6C and 6D are provided for the purpose of illustration, and not intended to limit the scope of the present disclosure. Various variations and modifications may be conducted under the teaching of the present disclosure. For example, the connector 600C and/or the detector 130 may be covered by any number of protective plates. The protective plates may cover any side of the connector 600C.

Figure 7C:
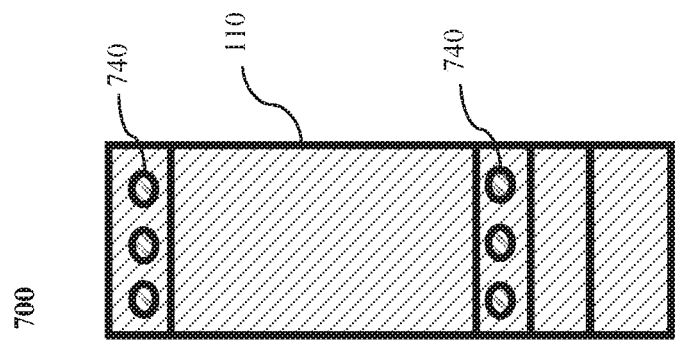
FIGS. 7A to 7C illustrate schematic diagrams of an exemplary cooling device in a PET device according to some embodiments of the present disclosure.
Figure 7B:
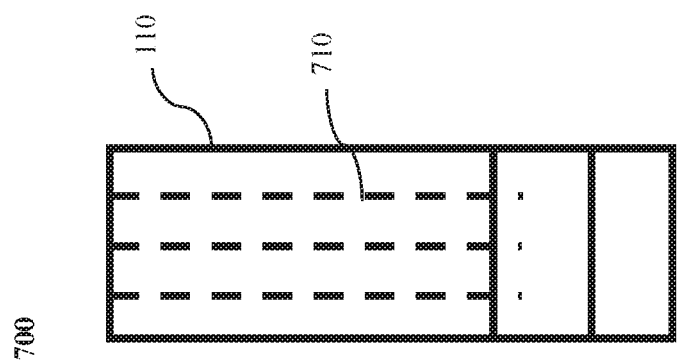
Figure 7A:
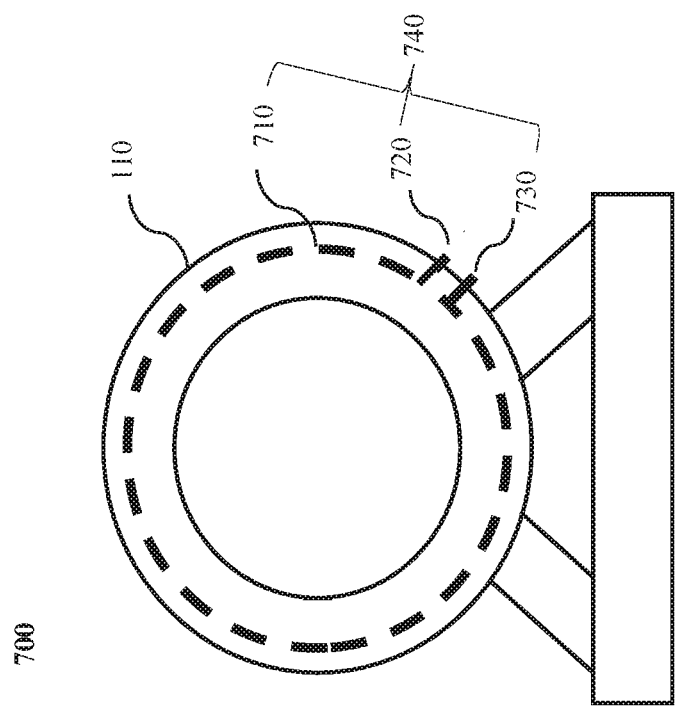

FIGS. 7A to 7C illustrate schematic diagrams of an exemplary cooling device 740 in a PET device 700 according to some embodiments of the present disclosure. FIG. 7A illustrates a front view of cooling device 740 in the PET device 700. FIG. 7B illustrates a side view of cooling device 740 in the gantry 700. FIG. 7C illustrates a cross-sectional view of the cooling device 740 in the PET device 700.

The PET device 700 may include a gantry 110 and the cooling device 740. The cooling device 740 may be configured to cool one or more components of the PET device. For example, the PET device 700 may include one or more components that are the same as or similar to those as illustrated in FIG. 1, such as a detector 130, a connector 120, and a heat transfer device 140 (not shown in FIGS. 7A to 7C). The cooling device 740 may be configured to cool the detector 130, the heat transfer device 140, the connector 120, and/or the gantry 110.

The cooling device 740 may include one or more cooling conduits 710, a cooling liquid inlet 720, and a cooling liquid outlet 730. The cooling conduits 710 may be one or more pipes placed inside the gantry 110. Additionally or alternatively, the cooling conduits may be formed by the gantry 110.

The cooling conduits 710 may be arranged around the gantry 110 as illustrated in FIG. 7A. The cooling conduits 710 may be configured to house a cooling liquid. The cooling liquid may flow into the cooling conduits 710 via the cooling liquid inlet 720. The cooling liquid may be circulated though the cooling conduits 710 and flow out the gantry 110 via the cooling liquid outlet 730.

The cooling liquid may circulate though the cooling conduits 710 continuously at a constant rate. For example, the cooling liquid may be pumped into the cooling conduits 710 via the cooling liquid inlet 720 continuously at a constant rate. Alternatively, the cooling liquid may circulate though the cooling conduits 710 periodically and/or intermittently. For example, a certain amount of the cooling liquid may be pumped into the cooling conduits 710 via the cooling liquid inlet 720 in every minute. As another example, the cooling liquid may be pumped into the cooling conduits in response to an event, e.g., the temperature of a portion of the imaging system 100 exceeding a threshold.

The cooling liquid that flows into the cooling liquid inlet 720 may be at a desirable or low temperature (e.g., the temperature of the liquid being less than a threshold). For example, the cooling liquid may be cooling water. The cooling water may be processed by a chiller to maintain its temperature. The cooling liquid flowing through the cooling conduits 710 may cool one or more components of the PET device 700. For example, as described in connection with FIGS. 1 and 4A, the detector 130 may be mounted to the gantry 110 via the connector 120. The connector 120 may include a fixing plate 310 and a supporting plate 320. The fixing plate 310 may be attached to the gantry 110. The fixing plate 310 may transfer heat generated by the detector 130. The cooling liquid flowing through the cooling conduits 710 may absorb heat from the fixing plate 310 to cool the fixing plate 310.

When the cooling liquid flows through the cooling conduits 710, it may absorb heat from the one or more components of the PET device 700. Accordingly, the temperature of the cooling liquid that flows out of the cooling liquid outlet 730 may be higher than the cooling liquid that flows into the cooling liquid inlet 720. In some embodiments, the cooling liquid that flows out of the cooling liquid outlet 730 may be processed by a chiller to lower its temperature.

It should be noted that the structures and functions described above in relation to the examples illustrated in FIGS. 7A to 7C are provided for the purposes of illustration, and not intended to limit the scope of the present disclosure. Various variations and modifications may be conducted under the teaching of the present disclosure. In some embodiments, the cooling device 740 may include any number of the cooling conduits, cooling liquid inlets, and/or cooling liquid outlets other than those illustrated in FIGS. 7A through 7C. For example, the cooling device 740 may include a cooling liquid inlet 720 and a cooling liquid outlet 730 for each of the cooling conduits 710. As another example, a cooling conduit 710 may include a plurality of cooling liquid inlets 720 and/or a plurality of cooling liquid outlets 730. The cooling liquid inlets 720 and/or the cooling liquid outlets 730 may be configured in different positions on the cooling conduits 710.

Figure 8B:
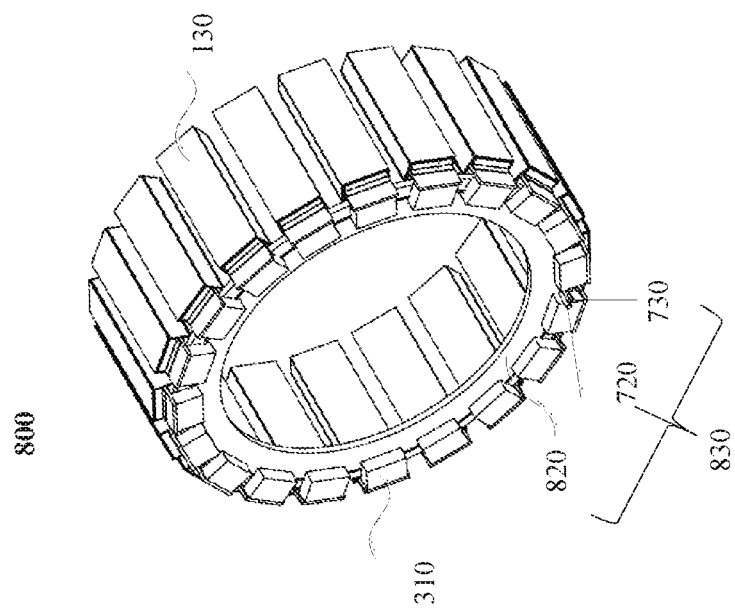
FIGS. 8A and 8B illustrate a portion of an exemplary PET device according to some embodiments of the present disclosure.
Figure 8A:
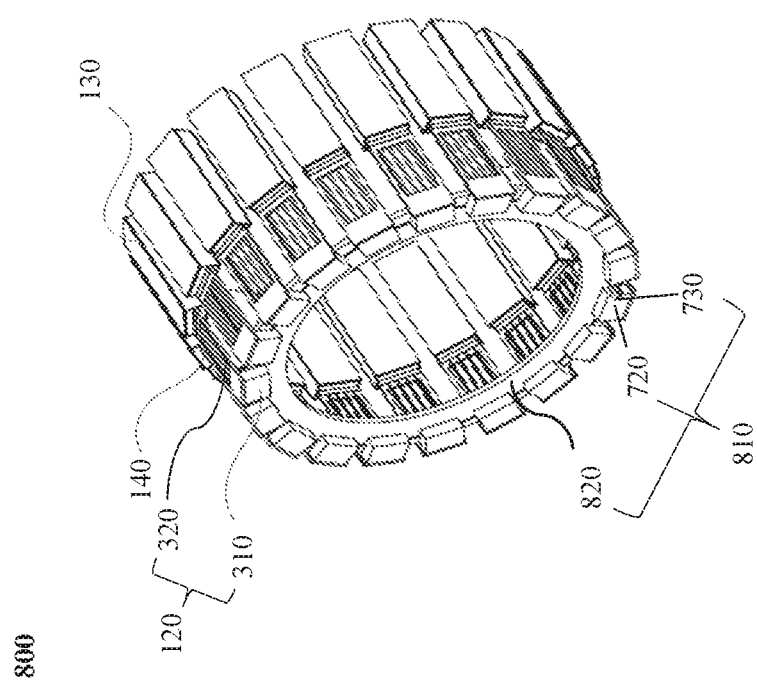

FIGS. 8A and 8B illustrate an exemplary PET device 800 according to some embodiments of the present disclosure. The PET device 800 may include one or more detectors (e.g., a detector 130), one or more connectors (e.g., a connector 120), a heat transfer device 140, and a cooling device 810. FIG. 8A illustrates the PET device 800 in which the connectors and the detectors are not assembled together. FIG. 8B illustrates the PET device 800 in which the connectors and the detectors are assembled together.

The connector 120 may include a fixing plate 310 and a supporting plate 320. The fixing plate 310 may be configured to fix the detector 130 to a gantry 110 of the PET device 800 (not shown in FIGS. 8A and 8B). The supporting plate 320 may be configured to support the detector 130. The heat transfer device 140 may include one or more heat transfer pipes configured to transfer heat generated by the detector 130 away. The fixing plate 310 and/or the supporting plate 320 may include one or more grooves to accommodate the heat transfer pipes. More descriptions regarding various examples of the connector 120 and/or the heat transfer device 140 may be found elsewhere in the present disclosure. See, e.g., FIGS. 1 to 4B and the relevant descriptions.

The cooling device 810 may be similar to the cooling device 740 as described in connection with FIGS. 7A to 7C, except for certain components or features. The cooling device 810 may include a cooling plate 820, a cooling liquid inlet 720, a cooling liquid outlet 730, and a cooling conduit (not shown in FIGS. 8A and 8B). The cooling plate 820 may be an annular plate that forms and/or accommodates the cooling conduit. The cooling conduit may be configured to house a cooling liquid. As illustrated in FIGS. 8A and 8B, the cooling plate 820 may be located around the detection tunnel and attached to the fixing plate 310 of the connector 120. The cooling liquid may circulate though the cooling conduits to cool, such as, for example, the fixing plate 310 and/or the gantry 110.

In some embodiments, the cooling plate 820 may be arranged in any configuration other than that shown in FIGS. 8A and 8B. For example, the cooling plate 820 may be placed near the fixing plate 310 and spaced from the fixing plate 310 by a distance. As another example, the cooling plate 820 may be arranged around the periphery of the connector 120. In some embodiments, the cooling plate 820 may include a plurality of sub-cooling plates. A sub-cooling plate may include a cooling conduit. The cooling conduits of the sub-cooling plates may be in contact or in fluid communication with each other. At least one of the sub-cooling plates may include a cooling liquid inlet. At least one of the sub-cooling plates may include a cooling liquid outlet. The cooling liquid inlet and the cooling liquid outlet may be arranged in the same or different sub-cooling plates. Alternatively, the cooling conduits of the sub-cooling plates may be neither in contact nor in fluid communication with each other. Each of the sub-cooling plates may include a cooling liquid inlet and a cooling liquid outlet.

The heat transfer pipes may be configured to house a phase-change material as described in connection with FIGS. 4A and 4B. The phase-change material may change its phase according to its temperature. In some embodiments, the phase-change material housed in the heat transfer pipes may have a desirable or low boiling point (e.g., the boiling point of the phased-change material being lower than a threshold). When the detector 130 generates heat, the phase-change material may absorb the heat and vaporize. The vaporized phase-change material in the portion of the heat transfer pipes disposed on the supporting plate 320 may flow towards the portion of the heat transfer pipes in the vicinity of the fixing plate 310. The fixing plate 310 may be cooled by the cooling device 810. The vaporized phase-change material in the portion of the heat transfer pipes in the vicinity of the fixing plate 310 may be cooled and then condense, and flow back to the portion of the heat transfer pipes disposed on the supporting plate 320.

It should be noted that the structures and functions describe above in relation to the examples illustrated in FIGS. 8A and 8B are provided for the purposes of illustration, and not intended to limit the scope of the present disclosure. Various variations and modifications may be conducted under the teaching of the present disclosure. For example, the cooling device 810 may be integrated into the gantry 110. As another example, the heat transfer device 140 may be arranged in a configuration other than the heat transfer pipes as illustrated in FIGS. 8A and 8B.

Figure 9B:
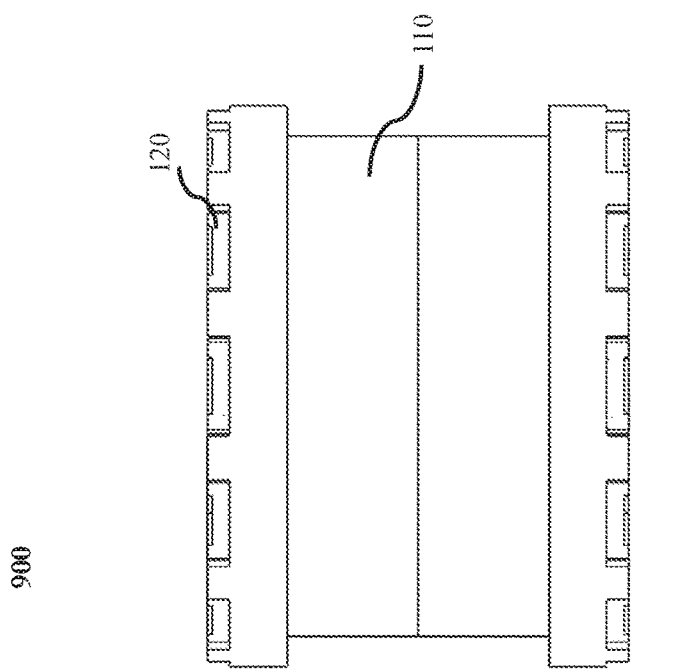
FIGS. 9A to 9D illustrate an exemplary PET ring according to some embodiments of the present disclosure.
Figure 9A:
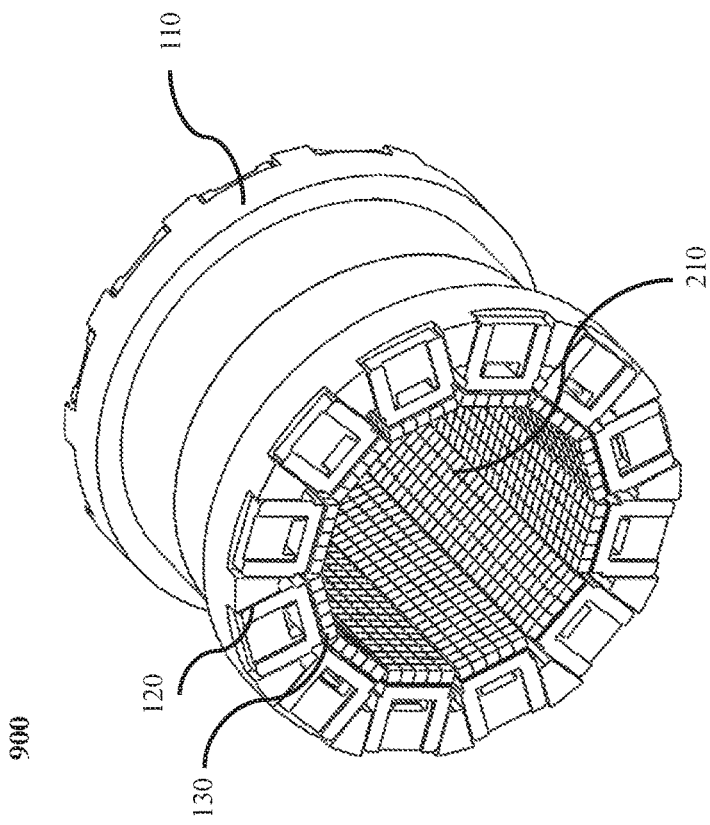
Figure 9D:
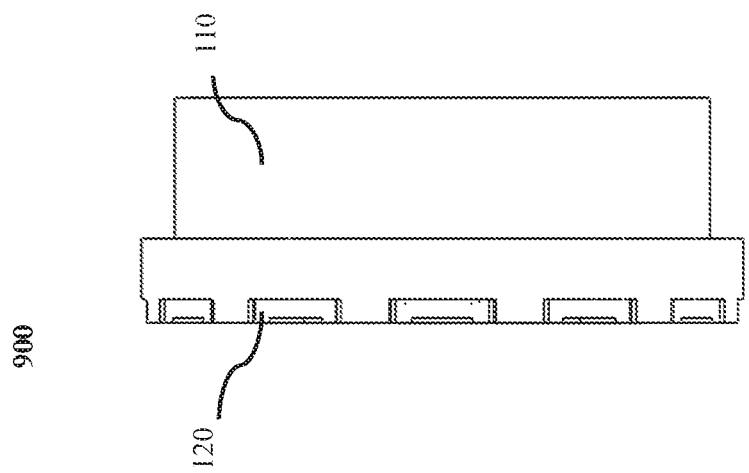
Figure 9C:
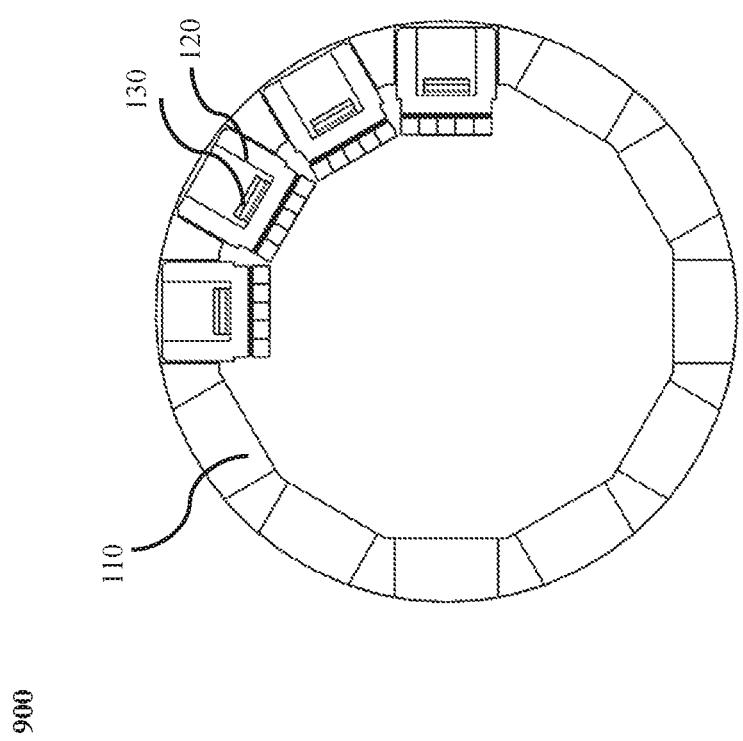

FIGS. 9A to 9D illustrate an exemplary PET ring 900 according to some embodiments of the present disclosure. FIG. 9A illustrates a perspective view of the PET ring 900. FIG. 9B illustrates a top view of the PET ring 900. FIG. 9C illustrates a front view of a PET ring 900. FIG. 9D illustrates a side view of a PET ring 900.

The PET ring 900 may include a gantry 110, one or more detectors (e.g., a detector 130), and one or more connectors (e.g., a connector 120). The gantry 110 may form a detection tunnel 210. The detectors may be mounted along the circumference of the detection tunnel 210. The connectors may be configured to establish a mechanical connection between the gantry 110 and the detectors. The connection may provide mechanical support of the detectors. The detectors may be mounted to the gantry 110. For example, as illustrated in FIG. 9A, the detectors may be mounted to the gantry 110 via the connectors on the front end surface of the gantry 110. Additionally or alternatively, one or more detectors may be mounted to the gantry 110 via one or more connectors (not shown in FIG. 9A) on the rear end surface of the gantry 110. The front end surface and the rear end surface may be two end surfaces opposite to each other and spaced apart along the z-axis of the PET ring 900. As another example, as illustrated in FIG. 9D, the detectors may be mounted to the gantry 110 via the connectors on one of the front end surface and the rear end surface of the PET ring 900.

In some embodiments, the PET ring 900 may include a heat transfer device and/or a cooling device. The heat transfer device may be configured to transfer away heat generated by one or more components of the PET ring 900, such as the detectors. For example, the heat transfer device may be one or more heat transfer pipes. The cooling device may be configured to transfer away heat generated by one or more components of the PET ring 900, such as the detectors and/or the connectors. More descriptions regarding the determinations of may be found elsewhere in the present disclosure. See, e.g., FIGS. 4A to 8B and the relevant descriptions.

It should be noted that the structures and functions described above in relation to the examples illustrated in FIGS. 9A to 9D are provided for the purposes of illustration, and not intended to limit the scope of the present disclosure. Various variations and modifications may be conducted under the teaching of the present disclosure. The PET ring 900 may include any number of detectors and/or any number connectors. The components of the PET ring 900, such as the connectors may be arranged in any configuration. For example, the PET ring 900 may include a connector that may fix multiple of detectors on the gantry 110. In some embodiments, the PET ring 900 may include a heat transfer device and/or a cooling device as described elsewhere in this disclosure.

Figure 10B:
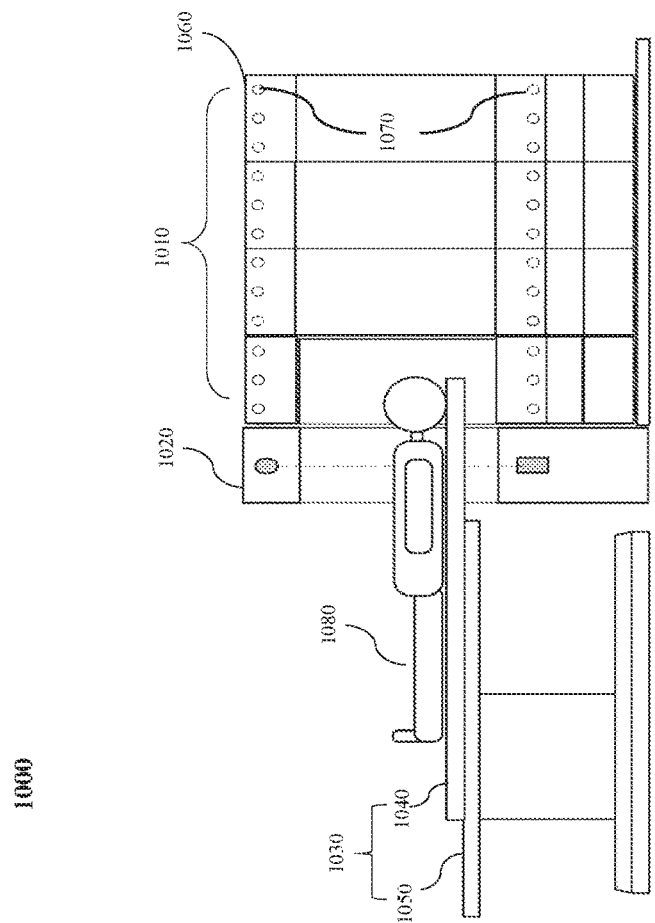
Figure 10A:
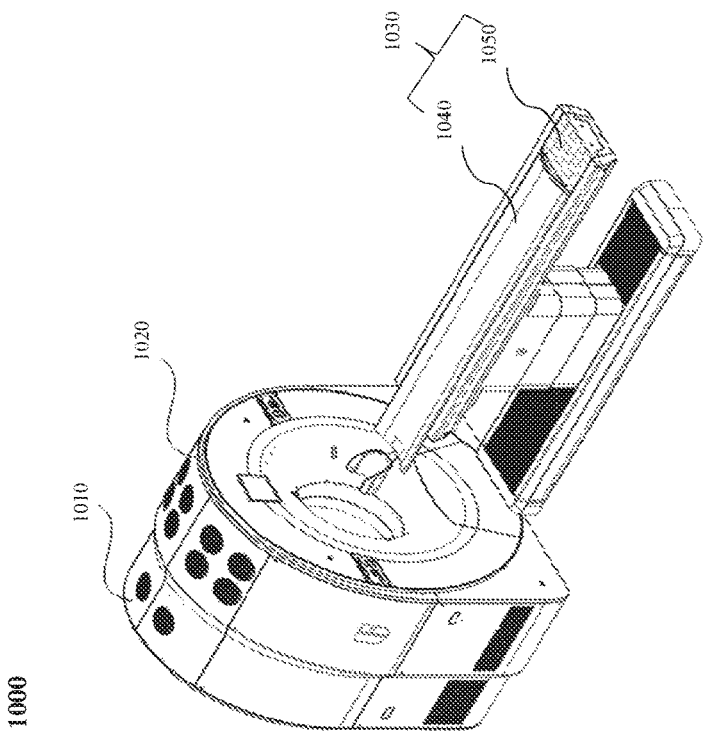

FIGS. 10A to 10C illustrate an exemplary imaging system 1000 according to some embodiments of the present disclosure. FIG. 10A illustrates a perspective view of the imaging system 1000. FIG. 10B illustrates a front view of the imaging system 1000. FIG. 10C illustrates a schematic diagram of the imaging system 1000. The imaging system 1000 may include a first imaging device and a second imaging device. The first imaging device may include one of a Magnetic Resonance Imaging (MRI) device, a Computed Tomography (CT) device, an X-ray device, or the like. The second imaging device may be a PET device.

For illustration purposes, the following description is provided with reference to a PET-CT device. As illustrated in FIGS. 10A to 10C, the PET-CT device includes a PET device 1010, a CT device 1020, and a table 1030. The PET device 1010 may have one or more components that are the same as or similar to those as illustrated in FIG. 1. For example, the PET device 1010 may include a first gantry, a first detector, a connector, a heat transfer device, and/or a cooling device. The first gantry may form a first detection tunnel. More descriptions regarding the components of the PET device 1010 may be found elsewhere in the present disclosure. See, e.g., FIGS. 1 to 9D and the relevant descriptions.

In some embodiments, as illustrated in FIG. 10B, the PET device 1010 may include a plurality of PET rings 1060. A PET ring may include one or more layers of detectors. The PET rings 1060 may be similar to the PET ring 900 as described in connection with FIGS. 9A to 9D, except for certain components or features. For example, the connectors do not fix the detectors on the side of the PET device 1010 that is adjacent to the CT device 1020. The PET device 1010 may include any number of layers of detectors. For example, the number of layers of detectors may be 32, 88, 96, or 112.

A PET ring 1060 may include a cooling device 1070. The cooling device 1070 may be similar to the cooling device 740 and/or the cooling device 810. For example, the cooling device 1070 may include a cooling conduit, a cooling liquid inlet, and a cooling liquid outlet. Additionally or alternatively, the cooling device 1070 may include a cooling plate. The cooling conduit, the cooling liquid inlet, and/or the cooling liquid outlet may be integrated into the cooling plate.

The CT device 1020 may include a second gantry, a second detector, and a radiation source. The second gantry may form a second detection tunnel. The second detection tunnel may be connected to the first detection tunnel of the PET device 1010. The radiation source may emit radioactive rays. The second detector may detect radioactive rays from the second detection tunnel striking the second detector. In some embodiments, the CT device 1020 may include a plurality of detectors arranged in the form of a detector ring.

The table 1030 may include a movable table top 1040 and a stand 1050. A subject 1080 (e.g., a patient, a region of interest of the patient) may be placed on the movable table top 1040 for scan. The movable table top 1040 may be moved into the detection tunnels of the CT device 1020 and the PET device 1010 along the z-axis. The subject 1080 may be positioned at different positions by adjusting the movable table top 1040 for a CT scan performed by the CT device 1020 and a PET scan performed by the PET device 1010.

The positions for the CT scan and/or the PET scan may at least partially depend on the structure of the PET-CT device. For example, a distance between the positions for the CT scan and the PET scan may at least partially depend on factors including, for example, the arrangement of the first detectors (the PET detectors) and the second detectors (the CT detectors), a distance between the PET device 1010 and the CT device 1020, or the like, or a combination thereof. As illustrated in FIG. 10C, the subject may be positioned at a position corresponding to a CT scanning cross section a for the CT scanning. The CT central scanning cross section a may pass through a tube (e.g., the radiation source) that emits a radiation beam and a midpoint of the entire length of the second detectors of the CT device 1020 along the z-axis. As used herein, the entire length of the second detectors of the CT device 1020 along the z-axis may equal to the distance along the z-axis between the two second detectors spaced farthest apart from each other in the CT device 1020. The subject may be positioned at a position corresponding to a PET s central canning cross section b for the PET scanning. The PET scanning central cross section b may pass through a midpoint of the entire length of the first detectors of the PET device 1010 along the z-axis. As used herein, the entire length of the first detectors of the PET device 1010 along the z-axis may equal to the distance along the z-axis between the two first detectors spaced farthest apart from each other in the PET device 1010.

For illustration purposes, the distance from the CT central scanning cross section a and the PET central scanning cross section b along the z-axis may be denoted as D. The first detectors of the PET device 1010 may be arranged between a cross section $b_R$ and a cross section $b_L$ as illustrated in FIG. 10C. The distance between the cross section $b_R$ and the cross section $b_L$ along the z-axis may be denoted as L. The distance between the cross section $b_R$ and the right side of the PET device 1010 (i.e., the side adjacent to the CT device 1020) along the z-axis may be denoted as d1. The distance between the left side of the CT device 1020 (i.e., the side adjacent to the PET device 1010) and the CT central scanning cross section a along the z-axis may be denoted as d2. The distance between the two adjacent sides of the PET device 1010 and the CT device 1020 along the z-axis may be denoted as d3. Accordingly, the distance D between the central scanning cross section a and the central scanning cross section b may equal a sum of the L/2, d1, d2, and d3, as illustrated in FIG. 10C.

Merely by way of example, the distance between the CT central scanning cross section a and the right side of the CT device 1020 (i.e., the side adjacent to the stand 1050 of the table 1030) along the z-axis may be smaller than 350 mm. For example, the distance may range from 300 mm to 330 mm. The d1, the distance between the cross section $b_R$ and the right side of the PET device 1010 (i.e., the side of the PET device 1010 that is adjacent to the CT device 1020) along the z-axis may be equal to or smaller than 105 mm. For example, d1 may be equal to or smaller than 90 mm.

In some embodiments, the first detectors may be assembled to the gantry of the PET device 1010 via a fixing mechanism (e.g., one or more connectors as described elsewhere in this disclosure) on one or more surfaces except for the front end surface adjacent to or facing the CT device 1020. For example, the first detectors may be assembled on the gantry of the PET device 1010 via a fixing mechanism on the rear end surface opposite to the front end surface adjacent to or facing the CT device 1020, and/or one or more side surfaces of the gantry of the PET device 1010. In such a way, the fixing mechanism of the first detectors does not occupy the space between the PET device 1010 and the CT device 1020 (e.g., the space illustrated as d3 in FIG. 10C). The distance D between the central scanning cross section a of the CT device 1020 and the central scanning cross section b of the PET device 1010 may be shortened. The shortened distance D may allow to reduce the distance the movable table top 1040 extends in order to position a subject 1080 for a PET scanning (e.g. position the subject 1080 at the scanning cross section b of the PET device 1010), which in turn may reduce the deformation of the movable table top 1040.

The absence of the fixing mechanism on the front end surface of the gantry of the PET device 1010 may simplify the interface or space between the PET device 1010 and the CT device 1020. For instance, the absence of the fixing mechanism in the interface or space between the PET device 1010 and the CT device 1020 may reduce the chances that the PET device 1010 or the a portion thereof (e.g., the fixing mechanism of the PET device 1010) hits the CT device 1020 during a normal operation of either one of the CT device 1020 or the PET device 1010, or by accident. As another example, the absence of the fixing mechanism on the front end surface of the gantry of the PET device 1010 may allow convenient installation or repair of the PET device 1010 detectors or the fixing mechanism thereof, and avoid or reduce the need to work at the interface of the PET device 1010 and the CT device 1020.

It should be noted that the structures and functions described above in relation to the examples illustrated in FIGS. 10A to 10C are provided for the purposes of illustration, and not intended to limit the scope of the present disclosure. Various variations and modifications may be conducted under the teaching of the present disclosure. In some embodiments, the PET device 1010 and the CT device 1020 may be arranged in any positions. For example, the distance between the CT scanning cross section a and the PET scanning cross section b along the z-axis may be a value other than that exemplified elsewhere in the present disclosure. In some embodiments, the imaging system 1000 may include the PET device 1010 and one of an MRI device, an X-ray device, or the like.

Figure 11:
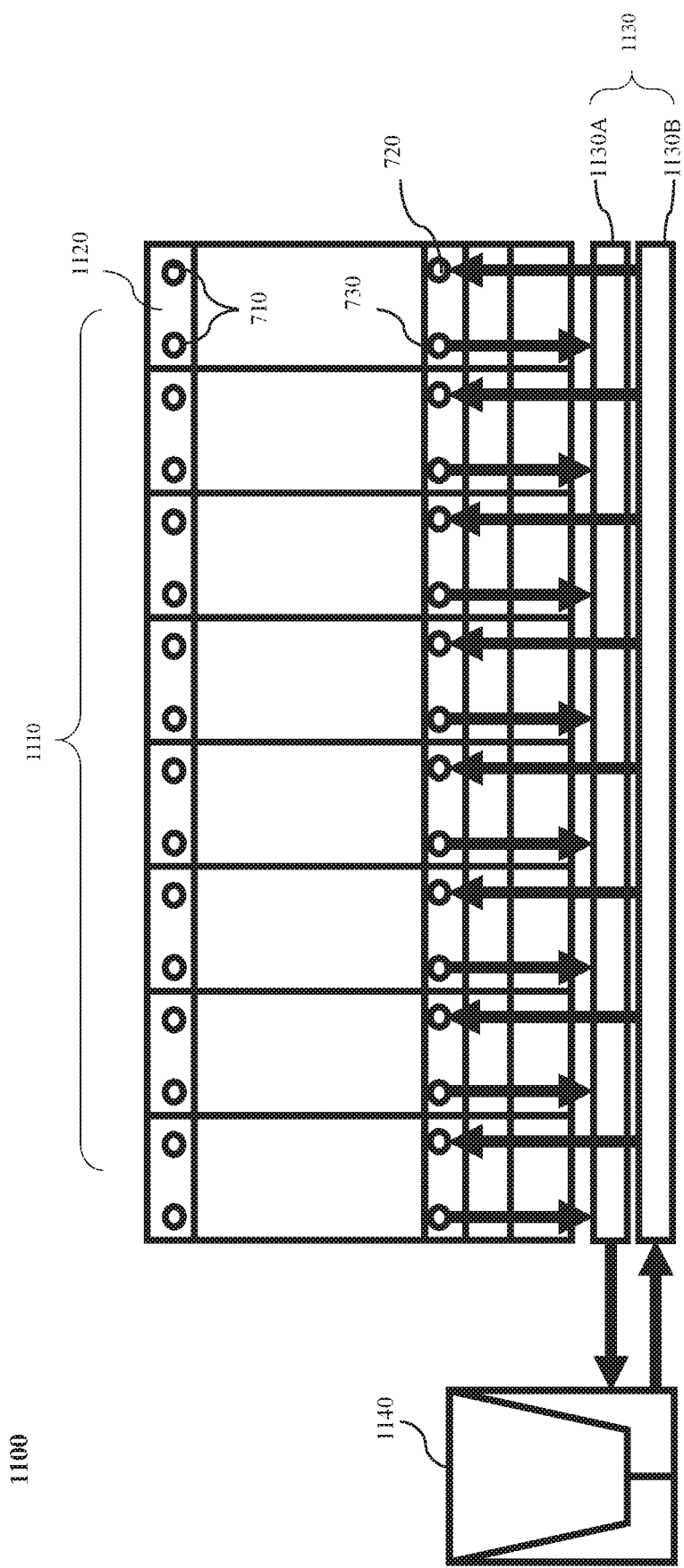
FIG. 11 illustrates an exemplary cooling system of a PET device according to some embodiments of the present disclosure.

FIG. 11 illustrates an exemplary cooling system 1100 of a PET device 1110 according to some embodiments of the present disclosure. The PET device 1110 may include one or more PET rings (e.g., a PET ring 1120). The PET device 1110 illustrated in FIG. 11 includes 8 PET rings. The cooling system 1100 may include a cooling device for each of the PET rings, a chiller 1140, and one or more pipelines 1130. The cooling device for each of the PET rings may be similar to the cooling device 740 and/or the cooling device 810. For example, the cooling device of a PET ring 1120 may include one or more cooling conduits 710, a cooling liquid inlet 720, and a cooling liquid outlet 730. Additionally or alternatively, the cooling device 1070 may include a cooling plate (not shown in FIG. 11). The cooling conduit 710, the cooling liquid inlet 720, and/or the cooling liquid outlet 730 may be integrated into the cooling plate. The cooling devices of different PET rings may have the same configuration or different configurations.

For illustration purposes, the cooling device of the PET ring 1120 is described as an example. As described in connection with FIG. 7, the cooling conduits 710 may be configured to house a cooling liquid. The cooling liquid may flow into the cooling conduits 710 via the cooling liquid inlet 720. The cooling liquid may circulate though the cooling conduits 710 and flow out of the PET ring 1120 via the cooling liquid outlet 730. The cooling liquid may absorb heat from the one or more components of the PET device 1110 when it flows through the cooling conduits 710. Accordingly, the temperature of the cooling liquid that flows out of the cooling liquid outlet 730 may be higher than the cooling liquid that flows into the cooling liquid inlet 720.

The chiller 1140 may be configured to cool the used cooling liquid to a desirable or low degree (e.g., the temperature of the liquid being lower than a threshold). The pipelines 1130 may include a first pipeline 1130A and a second pipeline 1130B. The first pipeline 1130A may be configured to collect the cooling liquid flowing out the cooling liquid outlet 730 and pump it to the chiller 1140. The chiller 1140 may process the cooling liquid to cool it to the describable or low degree. The processed cooling liquid may be pumped to the cooling liquid inlet 720 via the second pipeline 1130B. The processed cooling liquid may then flow through the PET ring 1120 to cool the components in the PET ring 1120.

It should be noted that the structures and functions described above in relation to the examples illustrated in FIG. 11 are provided for the purposes of illustration, and not intended to limit the scope of the present disclosure. Various variations and modifications may be conducted under the teaching of the present disclosure. For example, the PET device 1110 may include any number of PET rings. The PET rings may have any number of cooling conduits. As another example, the chiller 1140 may be any device that can cool the cooling liquid, such as a heat exchanger. As a still further example, the cooling system 1100 may be applied to various imaging systems, such as the imaging system 1000 as described in connection with FIGS. 10A to 10C.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A multi-modality system comprising:
a positron emission tomography (PET) device,
a gantry of the PET device forming a detection tunnel;
a detector of the PET device mounted to the gantry, and positioned along a circumference of the detection tunnel;
a connector configured to mount the detector to the gantry;
a heat transfer device mounted on the connector, thermally coupled with the detector and configured to transfer heat generated by the detector, wherein;
the gantry of the PET device includes a first end surface, a second end surface opposite to the first end surface along an axial direction of the detection tunnel, and at least one third surface, and
the connector includes a fixing unit and a supporting unit, the fixing unit being configured to fix the detector on the at least one of the third surface or the second end surface of the gantry except the first end surface, and the supporting unit being configured to support the detector, and
the PET device is configured to be connected to a second medical device at the first end surface.

2. The system of claim 1, wherein the connector is an L-shaped connector.

3. The system of claim 1, wherein:
the supporting unit has a first surface and a second surface, the first component being mounted on the second surface of the supporting unit.

4. The system of claim 3, wherein the detector further comprises:
a scintillator,
a photodetector coupled to the scintillator, and
a front-end circuit board coupled to the photodetector, wherein:

the scintillator and the photodetector are fixed on the first surface of the supporting unit of the connector; and the second surface of the supporting unit further comprises a concave region configured to accommodate the front-end circuit board.

5. The system of claim 4, further comprising a first protective plate configured to cover the concave region of the second surface of the supporting unit and the front-end circuit board.

6. The system of claim 5, wherein:
the first protective plate further comprises a slider; and
the gantry further comprises a sliding rail that matches the slider.

7. The system of claim 6, wherein further comprises a second protective plate configured to cover the scintillator of the detector.

8. The system of claim 4, wherein:
the second surface of the supporting unit comprises a concave region, and
the concave region of the second surface of the supporting unit comprises a first groove configured to accommodate the first component of the heat transfer device.

9. The system of claim 1, further including the second medical device, wherein:
a space between the PET device and the second medical device defined at least in part by the first end surface is free of the connector.

10. The system of claim 1, wherein:
the fixing unit of the connector is made of a heat conductive material; and
the fixing unit of the connector forms at least part of the second component of the heat transfer device.

11. The system of claim 1, wherein the supporting unit further comprises a recess.

12. The system of claim 1, further comprising:
a cooling device thermally coupled to the heat transfer device, and configured to cool the heat transfer device.

13. The system of claim 12, wherein the cooling device further comprises a cooling plate attached to the fixing unit of the connector; and
the cooling plate is configured to cool the fixing unit of the connector.

14. The system of claim 13, wherein the cooling plate further comprises a first cooling liquid inlet, a first cooling liquid outlet; and a first cooling conduit that establishes a fluid connection between the first cooling liquid inlet and the first cooling liquid outlet for housing a first cooling liquid.

15. The system of claim 12, wherein:
the cooling device is integrated into the gantry; and
the gantry further comprises a second cooling liquid inlet, a second cooling liquid outlet, and a second cooling conduit that establishes a fluid connection between the second cooling liquid inlet and the second cooling liquid outlet for housing a second cooling liquid.

16. An imaging system, comprising a first imaging device and a second imaging device, wherein:
the second imaging device is a positron emission tomography (PET) device comprising:
a gantry of the PET device forming a detection tunnel;
a detector of the PET device mounted to the gantry, and positioned along a circumference of the detection tunnel;
a connector configured to mount the detector to the gantry; and
a heat transfer device mounted on the connector, thermally coupled with the detector and configured to transfer heat generated by the detector, wherein:
the gantry of the PET device includes a first end surface facing the first imaging device, a second end surface opposite to the first end surface along an axial direction of the detection tunnel, and at least one third surface,
the connector includes a fixing unit and a supporting unit, the fixing unit being configured to fix the detector on the at least one of the third surface or the second end surface of the gantry except the first end surface, and the supporting unit being configured to support the detector,
the PET device is configured to be connected to the first imaging device at the first end surface, and
a space between the PET device and the first imaging device defined at least in part by the first end surface is free of the connector.

17. The imaging system of claim 16, wherein the connector is L-shaped.

18. The imaging system of claim 16, wherein the first imaging device is at least one of a magnetic resonance imaging (MRI) device, a computed tomography (CT) device, or an X-ray device.

19. The imaging device of claim 18, wherein a distance between a central scanning cross section of the PET device and a central scanning cross section of the first imaging device is equal to or less than 330 mm.

\* \* \* \* \*